United States Patent
Adams et al.

(10) Patent No.: US 11,923,497 B2
(45) Date of Patent: Mar. 5, 2024

(54) ADDITIVES FOR IMPROVED BATTERY PERFORMANCE, IMPROVED ADDITIVE-CONTAINING MEMBRANES, IMPROVED BATTERY SEPARATORS, IMPROVED BATTERIES, AND RELATED METHODS

(71) Applicant: Celgard, LLC, Charlotte, NC (US)

(72) Inventors: Changqing Wang Adams, Fort Mill, SC (US); Kang Karen Xiao, Mississauga (CA); Stefan Reinartz, Waxhaw, NC (US); Masaaki Okada, Charlotte, NC (US); Brian R. Stepp, Scottsdale, AZ (US); Yao Lu, Harrisburg, NC (US); Eric Robert White, Fort Mill, SC (US); Katharine Chemelewski, Campbell, CA (US)

(73) Assignee: Celgard, LLC, Charlotte, NC (US)

( * ) Notice: Subject to any disclaimer, the term of this patent is extended or adjusted under 35 U.S.C. 154(b) by 0 days.

(21) Appl. No.: 17/515,580

(22) Filed: Nov. 1, 2021

(65) Prior Publication Data

US 2022/0115740 A1    Apr. 14, 2022

Related U.S. Application Data

(62) Division of application No. 16/347,664, filed as application No. PCT/US2017/060377 on Nov. 7, 2017, now Pat. No. 11,165,121.

(Continued)

(51) Int. Cl.
*H01M 50/449*    (2021.01)
*H01M 10/052*    (2010.01)
(Continued)

(52) U.S. Cl.
CPC ..... *H01M 10/052* (2013.01); *H01M 10/0525* (2013.01); *H01M 10/0567* (2013.01);
(Continued)

(58) Field of Classification Search
None
See application file for complete search history.

(56) References Cited

U.S. PATENT DOCUMENTS 5,061,384 A * 10/1991 Suzuki ............... D06M 13/285
                                                  252/8.84
5,231,126 A    7/1993 Shi et al.
(Continued)

FOREIGN PATENT DOCUMENTS

| JP | 2013-57045 | 3/2013 |
| WO | WO2014/152130 | 9/2014 |
| WO | WO2017/083633 | 5/2017 |

OTHER PUBLICATIONS

Kesting, Robert E. "Synthetic Polmeric Membranes, A Structural Perspective", Second Edition, John Riley and Sons, pp. 237-285.
(Continued)

*Primary Examiner* — Christopher P Domone
(74) *Attorney, Agent, or Firm* — Hammer & Associates, P.C.

(57) ABSTRACT

Described herein, are battery separators, comprising the following: a microporous polymeric film; and an optional coating layer on at least one side of the microporous polymeric film, wherein at least one of the microporous polymeric film and the optional coating comprises an additive. The additive is selected from the group consisting of a lubricating agent, a plasticizing agent, a nucleating agent, a shrinkage reducing agent, a surfactant, an SEI improving agent, a cathode protection agent, a flame retardant additive, $LiPF_6$ salt stabilizer, an overcharge protector, an aluminum corrosion inhibitor, a lithium deposition agent or improver,
(Continued)

or a solvation enhancer, an aluminum corrosion inhibitor, a wetting agent, and a viscosity improver. Also, described herein are batteries, including lithium-ion batteries, comprising one or more of the described separators. Methods for making the battery separators are also described.

9 Claims, 13 Drawing Sheets

Related U.S. Application Data

(60) Provisional application No. 62/418,435, filed on Nov. 7, 2016.

(51) Int. Cl.
*H01M 10/0525* (2010.01)
*H01M 10/0567* (2010.01)
*H01M 50/417* (2021.01)
*H01M 50/451* (2021.01)
*H01M 50/454* (2021.01)
*H01M 50/491* (2021.01)

(52) U.S. Cl.
CPC ....... *H01M 50/417* (2021.01); *H01M 50/451* (2021.01); *H01M 50/454* (2021.01); *H01M 50/491* (2021.01)

(56) References Cited

U.S. PATENT DOCUMENTS

| | | | |
|---|---|---|---|
| 5,491,188 | A | 2/1996 | Ikeda et al. |
| 5,681,922 | A | 10/1997 | Wolfschwenger et al. |
| 6,235,823 | B1 | 5/2001 | Ikeda et al. |
| 6,245,272 | B1 | 6/2001 | Takita et al. |
| 6,596,814 | B2 | 7/2003 | Kim et al. |
| 7,235,203 | B2 | 6/2007 | Sadamitsu et al. |
| 8,795,565 | B2 | 8/2014 | Wel et al. |
| 2008/0269366 | A1* | 10/2008 | Shaffer .................. C08L 53/02 521/134 |
| 2016/0104893 | A1* | 4/2016 | Itou .......................... H01M 4/13 524/400 |
| 2017/0084898 | A1 | 3/2017 | Stokes et al. |
| 2017/0263977 | A1* | 9/2017 | Jeon .................. H01M 10/0565 |
| 2017/0288192 | A1* | 10/2017 | Chen .................. H01M 50/434 |

OTHER PUBLICATIONS

Kesting, Robert E. "Synthetic Polmeric Membranes, A Structural Perspective", Second Edition, John Riley and Sons, pp. 291-296.

\* cited by examiner

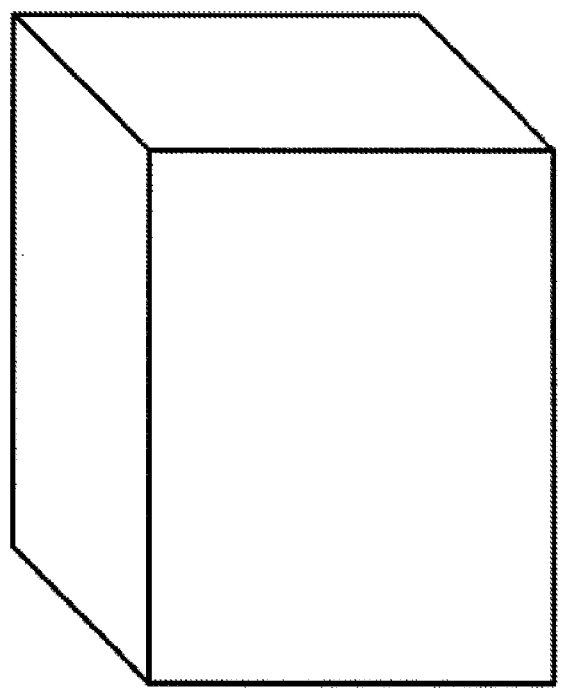
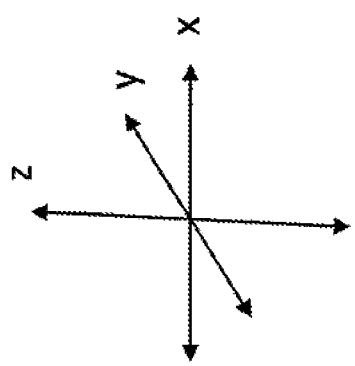
FIG. 10

A coextruded 2 layer PP precursor is proposed with the following structure:

Homopolymer PP + additive(s) to modify surface COF
Homopolymer PP + copolymer PP

FIG. 11

A coextruded 3 layer PP precursor is proposed with the following structure:

Homopolymer PP + additive(s) to modify surface COF
Homopolymer PP + copolymer PP
Hompolymer PP + additive(s) to modify surface COF

FIG. 12

A coextruded 3 layer PP precursor is proposed with the following structure:

Homopolymer PP + additive(s) to modify surface COF
Homopolymer PP + copolymer PP
Hompolymer PP + additive(s) to enhance coating adhesion

FIG. 13

A coextruded 4 layer PP precursor is proposed with the following structure:

Homopolymer PP + additive(s) to modify surface COF
Homopolymer PP + copolymer PP
Homopolymer PP + copolymer PP
Hompolymer PP + additive(s) to modify surface COF

FIG. 14

Another proposed 3 layer co-extruded structure for a battery or textile application can be the following:

1 — PP Blend / PP Block Copolym
2 — PP Block Copolym

Exemplary Co-Extruded Tri-Layer

| Homopolymer PP+ Additive to Modify Surface Coefficient of Friction |
|---|
| Homopolymer PP+ Copolymer PP |
| Homopolymer PP+ Additive to Modify Surface Coefficient of Friction |

ADDITIVES FOR IMPROVED BATTERY PERFORMANCE, IMPROVED ADDITIVE-CONTAINING MEMBRANES, IMPROVED BATTERY SEPARATORS, IMPROVED BATTERIES, AND RELATED METHODS

PRIORITY CLAIM

This application is a Divisional application of U.S. application Ser. No. 16/347,664, filed on May 6, 2019, which claims priority to PCT Application No. PCT/US2017/060377, filed Nov. 7, 2017, which claims the benefit of and priority to U.S. Provisional Patent Application No. 62/418,435, filed on Nov. 7, 2016, and incorporated herein in its entirety by reference.

FIELD

In accordance with at least selected embodiments, this application or invention is directed to additives for improved battery performance, improved additive containing membranes, improved battery separators, and/or improved batteries, and/or improved or related methods of manufacture and/or use thereof. In accordance with at least certain embodiments, this application or invention is directed to additive-containing membranes, separator membranes, and/or battery separators, and/or methods for making and/or for using such membranes, separator membranes, and/or battery separators. In accordance with at least particular embodiments, this application or invention is directed to the incorporation of additives into microporous membranes or separator membranes for use in secondary lithium batteries, such as secondary lithium ion batteries, improved battery separators, and/or related methods. In some embodiments, the membrane may contain additives that improve performance in battery chemistries, for example, in lithium ion batteries. In other selected embodiments, the membrane may contain additives that improve pin removal performance such as siloxane or lithium stearate. In other certain embodiments, the invention may also relate to methods for making such a membrane or separator membrane and methods for using such a membrane or separator membrane, for example, as a lithium battery separator. In accordance with at least selected embodiments, the present application or invention is directed to novel or improved porous membranes, separator membranes, separators, dry process separators, composites, electrochemical devices, batteries, methods of making such membranes, separators, composites, devices and/or batteries. In accordance with at least certain selected embodiments, the present invention is directed to a novel or improved separator membrane that contains additives or elastomers. The improved membrane may preferably demonstrate improved shutdown, improved strength, improved dielectric breakdown strength, and/or reduced tendency to split. In accordance with at least certain selected embodiments, this application or invention is directed to battery separators having a microporous polymeric film or membrane and an optional coating layer on at least one side of the microporous polymeric film, wherein at least one of the microporous polymeric film and the optional coating comprises an additive. The additive may be selected from the group of a lubricating agent, a plasticizing agent, a nucleating agent, a shrinkage reducing agent, a surfactant, an SEI improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, a viscosity improver, a friction reducer, a COF reducer, a pin removal force reducer, a co-polymer, a block co-polymer, and/or combinations thereof. Also, described herein are batteries, including primary or secondary lithium ion batteries, comprising one or more of the described films, membranes, coatings, and/or separators. Methods for making the films, membranes, coatings, and/or battery separators are also described. In accordance with at least particular embodiments, this application or invention is directed to improved or novel battery separators having at least one of increased puncture strength, decreased pin removal force, improved electrolyte wettability, and increased pore size, microporous polymeric films with an optional coating layer on at least one side of the microporous polymeric film, battery separators having at least one of an optional coating and an microporous polymeric film including therein and/or thereon an additive selected from the group of a lubricating agent, a surfactant, a nucleating agent, a shrinkage reducing agent, and/or a plasticizing agent, microporous polymeric films having an additive present mainly in at least one surface region of the film or present throughout the film, present in a single surface region of the film, present in a first surface region of the film and in a second surface region of the film that is opposite to the first surface region, a coating applied to a surface of the microporous polymeric film, the coating may be applied to only one surface of the microporous polymeric film, to a first side of the microporous polymeric film and another coating may be applied to a second side of the microporous polymeric film that is opposite to the first side, and/or combinations thereof. In accordance with at least possibly preferred embodiments, the microporous polymeric film or membrane is a microporous polyolefin membrane such as a dry stretch process membrane such as a monolayer dry-process film, a bilayer dry-process film, or a multilayer dry-process film. Also, in accordance with at least possibly preferred embodiments, one, or two, or three, or four, or all five of the different types of additives may be added or a single additive that acts as one, or two, or three, or four, or all five of the different types of additives may be added to the film, coating or separator, for example, an additive that is both a lubricant and a surfactant may be added therein or thereon.

BACKGROUND

Ways for improving battery separators and batteries are discussed in the art. Regarding ways for improving battery separators, many of these methods focus on manipulating the polymer by way of manipulating the extrusion process (i.e. coextrusion or altering blow up ratio) or by incorporating various stretching techniques such as biaxially stretching. Other methods for improving battery separators involved manipulating the type of resin used, e.g., a high molecular weight or low molecular weight resin.

Reducing polypropylene microporous membrane surface friction for the ease of pin removal during battery jelly roll making process is becoming ever more challenging as separators get thinner and/or their pore size gets larger to meet market demands. U.S. Pat. No. 6,692,867 has described the use of calcium stearate for improving pin removal. Although calcium stearate has been used, it tends to "bloom" or "snow" out during a high temperature extrusion process and contaminate the equipment. Higher temperature tolerant additives are desired. Further, although added calcium stearate was sufficient in the past for improving pin removal of older thicker separator products, it is not sufficient for at least certain newer separators that are being made thinner and thinner to meet market demands, and it cannot be added in high enough amounts without undesirable increased "blooming" or "snowing." Thus, a new alternative for improving pin removal in at least certain separator products is needed.

Regarding improvement of batteries, one of the critical aspects enabling the commercialization of future battery chemistries and technologies is the incorporation of electrolyte additives into the electrolyte system. By including electrolyte additives, it is possible to, for example, stabilize high voltage cell operation and prolong the lifetime of the battery. Some popular additives include borate salts, vinyl carbonates, and many other materials. These are typically added to the liquid electrolyte solution before cell fabrication. However, it is difficult to ensure reproducible batch preparation, and the shelf life of electrolyte with additives may be very short. The electrolyte solution should be mixed and used within a short time frame. Thus, a new way of providing the electrolyte additives without these problems is desirable.

Despite the many mentions of improving membrane mechanical strength and working compositions optimized for high voltage systems in the art, there still exists a need for novel methods of improving strength while balancing electrochemical cell performance.

SUMMARY

In accordance with at least selected embodiments, this application or invention may address the above needs, desired improvements, problems, or issues, and/or may provide new and/or improved additives for improved battery performance, improved additive containing membranes, improved battery separators, and/or improved batteries, and/or improved or related methods of manufacture and/or use thereof. In accordance with at least certain embodiments, this application or invention is directed to additive-containing membranes, separator membranes, and/or battery separators, and/or methods for making and/or for using such membranes, separator membranes, and/or battery separators. In accordance with at least particular embodiments, this application or invention is directed to the incorporation of additives into microporous membranes or separator membranes for use in secondary lithium batteries, such as secondary lithium ion batteries, improved battery separators, and/or related methods. In some embodiments, the membrane may contain additives that improve performance in battery chemistries, for example, in lithium ion batteries. In other selected embodiments, the membrane may contain additives that improve pin removal performance such as siloxane or lithium stearate. In other certain embodiments, the invention may also relate to methods for making such a membrane or separator membrane and methods for using such a membrane or separator membrane, for example, as a lithium battery separator. In accordance with at least selected embodiments, the present application or invention is directed to novel or improved porous membranes, separator membranes, separators, dry process separators, composites, electrochemical devices, batteries, methods of making such membranes, separators, composites, devices and/or batteries. In accordance with at least certain selected embodiments, the present invention is directed to a novel or improved separator membrane that contains additives or elastomers. The improved membrane may preferably demonstrate improved shutdown, improved strength, improved dielectric breakdown strength, and/or reduced tendency to split. In accordance with at least certain selected embodiments, this application or invention is directed to battery separators having a microporous polymeric film or membrane and an optional coating layer on at least one side of the microporous polymeric film, wherein at least one of the microporous polymeric film and the optional coating comprises an additive. The additive may be selected from the group of a lubricating agent, a plasticizing agent, a nucleating agent, a shrinkage reducing agent, a surfactant, an SEI improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, a viscosity improver, a friction reducer, a COF reducer, a pin removal force reducer, a co-polymer, a block co-polymer, and/or combinations thereof. Also, described herein are batteries, including primary or secondary lithium ion batteries, comprising one or more of the described films, membranes, coatings, and/or separators. Methods for making the films, membranes, coatings, and/or battery separators are also described. In accordance with at least particular embodiments, this application or invention is directed to improved or novel battery separators having at least one of increased puncture strength, decreased pin removal force, improved electrolyte wettability, and increased pore size, microporous polymeric films with an optional coating layer on at least one side of the microporous polymeric film, battery separators having at least one of an optional coating and an microporous polymeric film including therein and/or thereon an additive selected from the group of a lubricating agent, a surfactant, a nucleating agent, a shrinkage reducing agent, and/or a plasticizing agent, microporous polymeric films having an additive present mainly in at least one surface region of the film or present throughout the film, present in a single surface region of the film, present in a first surface region of the film and in a second surface region of the film that is opposite to the first surface region, a coating applied to a surface of the microporous polymeric film, the coating may be applied to only one surface of the microporous polymeric film, to a first side of the microporous polymeric film and another coating may be applied to a second side of the microporous polymeric film that is opposite to the first side, and/or combinations thereof. In accordance with at least possibly preferred embodiments, the microporous polymeric film or membrane is a microporous polyolefin membrane such as a dry stretch process membrane such as a monolayer dry-process film, a bilayer dry-process film, or a multilayer dry-process film. Also, in accordance with at least possibly preferred embodiments, one, or two, or three, or four, or all five of the different types of additives may be added or a single additive that acts as one, or two, or three, or four, or all five of the different types of additives may be added to the film, coating or separator, for example, an additive that is both a lubricant and a surfactant may be added therein or thereon.

In accordance with at least selected embodiments, aspects or objects, this application or invention is directed to improved additive containing membranes, improved battery separators, and/or improved batteries, and/or improved or related methods of manufacture and/or use thereof.

In accordance with at least certain embodiments, this application or invention is directed to additive-containing polyolefin membranes, polyolefin separator membranes, and/or polyolefin membrane battery separators, and/or methods for making and/or for using such polyolefin membranes, separator membranes, and/or battery separators. In accordance with at least certain selected embodiments, this application or invention is directed to battery separators having a microporous polyolefin film or membrane and an optional coating layer on at least one side of the microporous polyolefin film, wherein at least one of the microporous film and the optional coating comprises an additive. The additive may be selected from the group of a lubricating agent, a plasticizing agent, a nucleating agent, a shrinkage reducing agent, a surfactant, an SEI improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, a viscosity improver, a friction reducer, a COF reducer, a pin removal force reducer, a co-polymer, a block co-polymer, and/or combinations thereof. Also, described herein are batteries, including primary or secondary lithium ion batteries, comprising one or more of the described polyolefin films, membranes, coatings, and/or separators. Methods for making the polyolefin films, membranes, coatings, and/or battery separators are also described. In accordance with at least particular embodiments, this application or invention is directed to improved or novel polyolefin membrane battery separators having at least one of increased puncture strength, decreased pin removal force, improved electrolyte wettability, and increased pore size, microporous polyolefin films with an optional coating layer on at least one side of the microporous film, battery separators having at least one of an optional coating and an microporous polyolefin film including therein and/or thereon an additive selected from the group of a lubricating agent, a surfactant, a nucleating agent, a shrinkage reducing agent, and/or a plasticizing agent, microporous polyolefin films having an additive present mainly in at least one surface region of the film or present throughout the film, present in a single surface region of the film, present in a first surface region of the film and in a second surface region of the film that is opposite to the first surface region, a coating applied to a surface of the microporous film, the coating may be applied to only one surface of the microporous film, to a first side of the microporous film and another coating may be applied to a second side of the microporous film that is opposite to the first side, and/or combinations thereof. In accordance with at least possibly preferred embodiments, the microporous polyolefin film or membrane is a microporous polyolefin dry stretch process membrane such as a monolayer dry-process film, a bilayer dry-process film, or a multilayer dry-process film. Also, in accordance with at least possibly preferred embodiments, one, or two, or three, or four, or all five of the different types of additives may be added or a single additive that acts as one, or two, or three, or four, or all five of the different types of additives may be added to the film, coating or separator, for example, an additive that is both a lubricant and a surfactant may be added therein or thereon.

In one aspect, a battery separator is described herein. Particularly, a battery separator having, for example, at least one of increased puncture strength, decreased pin removal force, improved electrolyte wettability, and increased pore size is described herein.

The battery separator comprises, consists of, or consists essentially of the following: a microporous polymeric film and an optional coating layer on at least one side of the microporous polymeric film. In the battery separator, at least one of the optional coating and the microporous polymeric film comprises an additive selected from the group consisting of a lubricating agent, a surfactant, a nucleating agent, a shrinkage reducing agent and a plasticizing agent.

In embodiments where the additive is present in the microporous polymeric film, the additive may be present mainly in at least one surface region of the film or may be present throughout the film. In some embodiments, the additive may be present in a single surface region of the film. In other embodiments, the additive may be present in a first surface region of the film and in a second surface region of the film that is opposite to the first surface region.

In some embodiments the additive may be in a coating applied to a surface of the microporous polymeric film. In some embodiments the coating may be applied to only one surface of the microporous polymeric film. In other embodiments, the coating may be applied to a first side of the microporous polymeric film and another coating may be applied to a second side of the microporous polymeric film that is opposite to the first side.

The microporous polymeric film or membrane may be a non-woven stretched film or membrane, such as a monolayer dry-process film, a bilayer dry-process film, or a multilayer dry-process film (and may have a layer, coating or treatment applied to at least one side thereof).

One, or two, or three, or four, or all five of the different types of additives may be added or a single additive that acts as one, or two, or three, or four, or all five of the different types of additives may be added. For example, an additive that is both a lubricant and a surfactant. The additive may be present in an amount from 10,000 to 200,000 ppm, from 10,000 ppm to 100,000 ppm, from 10,000 ppm to 60,000 ppm, or from 10,000 ppm to 30,000 ppm.

In some embodiments, the additive is a lubricating agent. It can also be at least one of a surfactant, a nucleating agent, a shrinkage reducing agent and a plasticizing agent. The lubricating agent may be a water-soluble lubricating agent. The lubricating agent may also be a lubricating agent that has a melting point of above 220° C., above 230° C., or above 240° C. In some embodiments, the lubricating agent is a fatty acid salt that is at least one of the following properties: it is water-soluble or has a melting point of above 220° C., above 230° C., or above 240° C. In some embodiments, the fatty acid salt has both of these properties. In some embodiments, the fatty acid salt is selected from lithium stearate, sodium stearate and potassium stearate. In some embodiments, the lubricating agent is a polysiloxane, including an ultra-high molecular weight polysiloxane.

In another embodiment, another battery separator is described herein. This battery separator comprises an electrolyte additive, which may be released from the separator into an electrolyte when the separator is incorporated into a battery, particularly a lithium-ion battery.

The battery separator comprises, consists of, or consists essentially of the following: a microporous polymeric film and an optional coating layer on at least one side of the microporous polymeric film. In the battery separator, at least one of the optional coating and the microporous polymeric film comprises an electrolyte additive.

In embodiments where the electrolyte additive is present in the microporous polymeric film, the additive may be present mainly in at least one surface region of the film or may be present throughout the film. In some embodiments, the additive may be present in a single surface region of the film. In other embodiments, the electrolyte additive may be present in a first surface region of the film and in a second surface region of the film that is opposite to the first surface region.

In some embodiments, the electrolyte additive may be in a coating applied to a surface of the microporous polymeric film. In some embodiments, the coating may be applied to only one surface of the microporous polymeric film. In other embodiments, the coating may be applied to a first side of the microporous polymeric film and another coating may be applied to a second side of the microporous polymeric film that is opposite to the first side.

The microporous polymeric film or membrane may be a blown or cast and stretched non-woven polyolefin film or membrane, such as a monolayer dry-process film, a bilayer dry-process film, or a multilayer dry-process film.

The electrolyte additive, in some embodiments, is selected from the group consisting of an SEI improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, and a wetting agent and viscosity improver. The amount of electrolyte additive may be from 1,000 to 200,000 ppm, from 1,000 to 100,000, from 10,000 ppm to 100,000 ppm, from 10,000 ppm to 60,000 ppm, or from 10,000 ppm to 30,000 ppm.

In another aspect, a battery, particularly a lithium-ion battery, comprising a separator with additives as described herein is described. In some embodiments, the battery comprises an electrolyte and the battery separator exhibits improved wettability for the electrolyte when compared to an identical battery separator without at least one of the additives described herein added. The electrolyte may be a Li salt in a liquid solvent such as $SO_2$ or $SOCl_2$, in some embodiments. In other embodiments, the additive is an electrolyte additive, which is released into the electrolyte after battery formation and/or during battery operation.

In another aspect, a method for forming the battery separators described herein is described. The method comprises at least one of the following steps: (1) forming the microporous polymeric film from a polymeric mixture comprising a polymer and the additive, and (2) coating the microporous film with a coating mixture comprising a polymer and the additive. The additive may be any of the additives mentioned hereinabove. In some embodiments, the step of forming the microporous polymeric film may comprise, consist of, or consist essentially of extruding the polymeric mixture comprising a polymer and the additive.

BRIEF DESCRIPTION OF THE DRAWINGS

FIG. 10 is a schematic drawing of a battery separator according to some embodiments, denoting the x, y, and z directions of the battery separator.

FIGS. 11 to 17 are respective schematic representations of certain coextruded multilayer precursors, membranes or separators according to some embodiments described herein.

DETAILED SUMMARY

Figure 1:
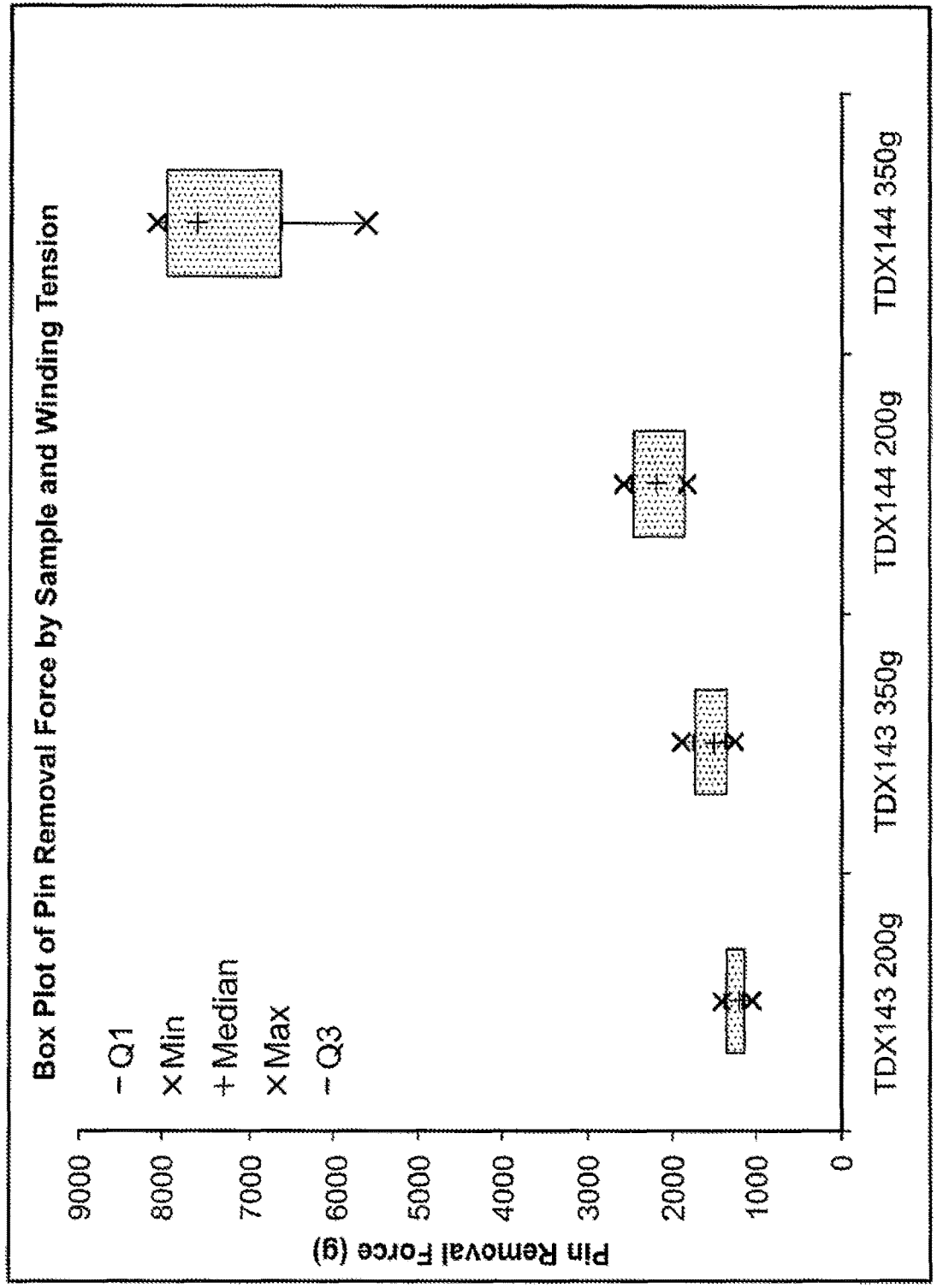
FIG. 1 is a box plot of pin removal force for battery separators according to some embodiments described herein.

This application is directed to an additive-containing battery separator and related methods for making and using the same. In some embodiments, the battery separator may comprise additives that improve at least one of the following: ease of handling or processing of the battery separator, e.g., lowering pin removal force, improved static control, and lower friction, performance properties of the separator, e.g., higher puncture strength, greater compatibility and wettability with the electrolyte, and higher overall strength.

Battery Separator

The battery separator preferably comprises, consists of, or consists essentially of the following: (1) a microporous polymeric film, and (2) an optional coating layer on one or more sides or surfaces of the microporous polymeric film (the coating may be more than one layer and the coating on each side may be the same or different, for example, a ceramic coating on just one side, a ceramic coating on one side and a polymer coating on the other side, or a ceramic coating covered by a polymer or adhesive over-coating on just one side). In some two-side coating embodiments, a coating is applied on a first side of the microporous film and on a side of the microporous film that is opposite to the first side. At least one of the microporous polymeric film and the optional coating contains one or more of (3) additives described herein.

A battery separator provides physical separation between the anode and cathode of a battery. In preferred embodiments, ions can flow across (thru) the separator in the battery, but at increased temperatures, the battery separator has shutdown capability, which stops the flow of ions.

(1) Microporous Polymeric Film

The microporous polymeric film is not so limited. In some preferred embodiments it is microporous and contains one or more polymers. A microporous film comprises pores whose average diameter or pore size is between 0.01 and 1.0 micron or from 0.01 to 0.5 micron, preferably between 0.01 to 0.08 microns, more preferably between 0.01 and 0.06 microns, and in some embodiments, from 0.01 to 0.04, from 0.01 to 0.03, or from 0.01 to 0.02 microns. In some embodiments, the porosity of the microporous polymeric film is from 20 to 90%, from 40 to 80%, or from 50 to 70%. Porosity is measured using ASTM D-2873 and is defined as the percentage of void space, e.g., pores, in an area of the porous substrate, measured in the Machine Direction (MD) and the Transverse Direction (TD) of the film. In some embodiments, the microporous polymeric film has a JIS Gurley of 50 to 800 seconds, in some embodiments a JIS Gurley of 100 to 600 seconds, in other embodiments the porous JIS Gurley of 200 to 500 seconds, in other embodiments it is 200 to 400 or 200 to 300 seconds. Gurley is defined herein as the Japanese Industrial Standard (JIS Gurley) and is measured herein using the OHKEN permeability tester. JIS Gurley is defined as the time in seconds required for 100 cc of air to pass through one square inch of film at a constant pressure of 4.9 inches of water. In some embodiments the pores of the microporous polymeric film are round, e.g., a sphericity factor of 0.25 to 8.0, oblong, slits, or oval-shaped.

The polymer of the microporous polymeric film is not so limited, and may be any polymer that is not inconsistent with the stated goals herein. For example, the polymer may be at least one selected from polyolefins, fluorocarbons, polyamides, polyesters, polyacetals (or polyoxymethylenes), polysulfides, polyvinyl alcohols, co-polymers thereof, and combinations thereof. Polyolefins may include polyethylenes (LDPE, LLDPE, HDPE, UHMWPE), polypropylene, polybutene, polymethylpentene, co-polymers thereof, and blends thereof. Fluorocarbons mayinclude polytetrafluoroethylene (PTFE), polychlorotrifluoroethylene (PCTFE), fluorinated ethylene propylene (FEP), ethylenechlortrifluoroethylene (ECTFE), ethylene tetrafluoroethylene (ETFE), polyvinylidene fluoride (PVDF), polyvinylfluoride (PVF), prefluoroalkoxy (PFA) resin, co-polymers thereof, and blends thereof. Polyamides may include, but are not limited to: polyamide 6, polyamide 6/6, Nylon 10/10, polyphthalamide (PPA), co-polymers thereof, and blends thereof. Polyesters may include polyester terephthalate (PET), polybutylene terephthalate (PBT), poly-1-4-cyclohexylenedimethyleneterephthalate (PCT), polyethylene naphthalate (PEN), and liquid crystal polymers (LCP). Polysulfides include, butare not limited to, polyphenylsulfide, polyethylene sulfide, co-polymers thereof, and blends thereof. Polyvinyl alcohols include, but are not limited to, ethylenevinyl alcohol, co-polymers thereof, and blends thereof. In some embodiments the porous substrate comprises at least one selected from the group consisting of: polyolefins (PO), e.g., polyethylene (PE), polypropylene (PP), polymethylpentene (PMP), etc., polyethylene terephthalate (PET), Aramide, polyvinylidene fluoride (PVDF), including polymers, co-polymers, and block-polymers thereof the group.

In some preferred embodiments, the polymer of the microporous polymeric film is a polyolefin, e.g., polypropylene or polyethylene. In some embodiments, the polyolefin described herein can be an ultra-low molecular weight, a low-molecular weight, a medium molecular weight, a high molecular weight, an ultra-high molecular weight polyolefin, or any combinations thereof. For example, an ultra-high molecular weight polyolefin may have a molecular weight of 450,000 (450 k) or above, e.g. 500 k or above, 650 k or above, 700 k or above, 800 k or above, etc. A high-molecular weight polyolefin may have a molecular weight in the range of 250 k to 450 k, e.g., 250 k to 400 k, 250 k to 350 k, or 250 k to 300 k. A medium molecular weight polyolefin may have a molecular weight from 150 to 250 k, e.g., 150 k to 225 k, 150 k to 200 k, 150 k to 200 k, etc. A low molecular weight polyolefin may have a molecular weight in the range of 100 k to 150 k, e.g., 100 k to 125 k. An ultra-low molecular weight polyolefin may have a molecular weight less than 100 k. The foregoing values are weight average molecular weights. In some embodiment, a higher molecular weight polyolefin may be used to increase strength or other properties of the microporous membranes or batteries comprising the same as described herein. In some embodiments, a lower molecular weight polymer, e.g., a medium, low, or ultra-low molecular weight polymer may be beneficial. For example, without wishing to be bound by any particular theory, it is believed that the crystallization behavior of lower molecular weight polyolefins may result in the microporous membrane as described herein having smaller pores.

The structure of the microporous polymeric film is also not limited, and the film may have any structure not inconsistent with the stated goals herein. For example, the film may have a monolayer, bi-layer, tri-layer, or multi-layer structure. Each layer may have a thickness ranging from 0.1 to 30 microns, from 0.1 to 25 microns, from 0.1 to 20 microns, from 0.1 to 15 microns, from 1 to 10 microns, or from 2 to 5 microns. The layers may be the same or of different thickness. A monolayer polymeric film as described herein has one polymer-containing layer. A bilayer polymeric film as described herein has two polymer-containing layers. The bilayer polymeric film may be formed, for example, by coextruding two polymer-containing mixtures that may be the same or different. In other embodiments, the bilayer polymeric film may be formed by forming, separately, two monolayer polymeric films, and then laminating them together to form a bilayer structure. A trilayer as described herein has three polymer-containing layers. The trilayer may be formed, for example, by co-extruding three polymeric mixtures, each being the same or different. In an alternative embodiment, three different mono-layer films may be formed separately, and these films may be laminated together to form the trilayer structure. A multilayer structure as described herein has two or more layers comprising the same or different polymers or polymer mixtures. A multilayer structure may, in some embodiments, be formed by coextruding four or more different polymeric mixtures. In alternative embodiments, four or more monolayer films may be separately formed and laminated together. In other embodiments, two or more co-extruded bilayer, trilayer, or multilayer films may be formed and laminated to one another. In further embodiments a coextruded trilayer film may be formed and laminated with a separately formed monolayer, bilayer, trilayer, or multilayer film to form a unique multilayer or multi-layer coextruded and laminated structure.

In other embodiments, the microporous polymeric film may be a non-woven film. As understood by those skilled in the art, a non-woven film is formed by entangling fibers or filaments, e.g., polymeric fibers or filaments, mechanically, thermally, or chemically.

In preferred embodiments, the microporous polymeric film is a dry-process microporous polymeric film, meaning that the film was formed without the use of a solvent. An exemplary dry-process is a dry-stretch process comprising, consisting of, or consisting essentially of the steps of extruding a polymer to form a nonporous precursor film and stretching the precursor film to, among other things, form pores. An exemplary dry-stretch process is the Celgard® dry-stretch process. The extrusion step may, in some embodiments, include co-extrusion where two or more polymeric mixtures, which may be the same as each other or different, are coextruded.

The microporous polymer film may comprise an additive described herein throughout the film. In some embodiments, the additive is mainly in one or more surface regions of the microporous polymeric films. The term "surface region," means a region including a surface (x-y) of the microporous polymeric film and a depth (z) measured from the same surface of the microporous polymeric film. See, for example, FIG. 10, which shows the x, y, and z-directions of a cube, which represents the microporous polymer film described herein. The depth of the surface region may be from 0.1 to 30 microns, from 0.1 to 25 microns, from 0.1 to 20 microns, from 0.1 to 15 microns, from 1 to 10 microns, or from 2 to 5 microns. The phrase "mainly in one or more surface regions" means that 90% or more, 95% or more, or 99% or more of the additive is present in the one or more surface regions, instead of being outside of the one or more surface regions. In some embodiments, 100% of the additive may be contained in the one or more surface regions, and sometimes 80% or more of the additive is present in the one or more surface regions, instead of outside of them.

In some embodiments, the microporous polymeric film may be formed by any of the methods described hereinabove. In order to include the additive mainly in one or more surface regions of the microporous polymeric film, this may be done, in some embodiments, by separately forming three monolayer films, two containing additive, and one not containing an additive. Then, the two films that contain the additive may be laminated on either side of the film that does not contain the additive. In an alternative embodiment, a film comprising the additive mainly in one or more surface regions may be formed by coextruding three or more polymer mixtures, two comprising the additive and the rest not comprising the additive, to form a trilayer or multilayer structure where the outer-most two layers comprise the additive. The polymer mixtures may comprise the same or different polymers.

FIGS. 11 to 17 are respective schematic representations of certain coextruded multilayer precursors, membranes, films, or separators according to some embodiments described herein. Although it may be preferred they are dry process coextruded blown (bubble or annular die extrusion) and stretched products or membranes rather than cast coextruded (slot die extrusion) and stretched products or membranes, it is contemplated that slot die extrusion, wet process, particle stretch, BNBOPP, BOPP, collapsed bubble, lamination, and other processes may be used to form similar products.

In one preferred embodiment, the coextruded precursor may have a structure (PP1/PP1), (PP1/PP2), (PP2/PP2), (PP2/PP1), (PP1/PP2/PP3), (PP3/PP2/PP1), (PP1/PP2/PP2), (PP1/PP2/PP1), (PP1/PP1/PP2), (PP2/PP1/PP2), (PP3/PP3/PP2/PP1/PP1), (PP3/PP3/PP2/PP2/PP1/PP1), (PP3/PP3/PP3/PP2/PP2/PP2/PP1/PP1/PP1), etc.

PP1 may be made of a homopolymer PP and an additive to modify the surface coefficient of friction, including any anti-slip or anti-block additives like polysiloxane or siloxane. PP2 may be made of the same or a different PP homopolymer than PP1 and a copolymer of PP, and the PP copolymer may be any propylene-ethylene or ethylene-propylene random copolymer, block copolymer, or elastomer. PP3 may be made of the same or a different homopolymer PP than PP1 and PP2 and may also include an additive to modify the surface coefficient of friction, which may be the same or different from that used in PP1, or an additive to promote coating adhesion, or to otherwise modify the surface.

In other preferred embodiments, the coextruded precursor may have a structure (PP1/PP2/PP3) (PP3/PP2/PP1), (PP3/PP3/PP2/PP1/PP1), (PP3/PP3/PP2/PP2/PP1/PP1), (PP3/PP3/PP3/PP2/PP2/PP2/PP1/PP1/PP1), etc. PP1 may be any polypropylene blend. PP2 may be made of any PP block co-polymer, including those described herein. PP3 may be made of the same or a different PP-block co-polymer than that used in PP2 and/or may also includes an additive to modify surface coefficient of friction, which may be the same or different from that used in PP1, or an additive to promote coating adhesion, or to otherwise modify the surface.

(2) Co-Extrusion or Coextrusion

Co-extrusion is not so limited. An exemplary co-extrusion process and a co-extrusion die may be used. In some embodiments, co-extrusion is performed using a co-extrusion die with one or more extruders feeding the die. Typically, there is one extruder for each desired layer or microlayer of the ultimately formed co-extruded film. For example, if the desired co-extruded film has three microlayers, three extruders are used with the co-extrusion die. In at least one embodiment, the inventive membrane may be constructed of many layers, microlayers or nanolayers wherein the final product may contain 2 or more layers, microlayers and/or nanolayers. In at least certain embodiments the microlayer or nanolayer technology may be created by in a pre-encapsulation feed block prior to entering a cast film or blown film die.

In some preferred embodiments, the co-extrusion is a dry process blown (not cast) air bubble co-extrusion method and the blow-up ratio may be varied between 0.5 to 2.0, preferably, 0.7 to 1.8, most preferably 0.9 to 1.2. Following co-extrusion using this blow-up ratio, the film may be MD stretched, MD stretched and then TD stretched or simultaneously MD and TD stretched. The film may then be optionally calendared to further control thickness or porosity.

Co-Extrusion benefits include but are not limited to increasing the number of layers (interfaces), which without wanting to be bound by any particular theory, is believed to improve puncture strength. Also, co-extrusion, without wishing to be bound by any particular theory, is believed to result in an observed DB improvement. Specifically, DB improvement may be related to the uniformity or reduced PP pore size observed when a co-extrusion process is used. Also, co-extrusion allows for a wider number of choices of materials by incorporating blends in the layers or microlayers. Co-extrusion also allows formation of thin bi-layer, tri-layer or multi-layer films (coextruded films). For example, a tri-layer co-extruded film having a thickness of 8 or 10 microns or thinner may be formed. Co-extrusion allows for higher MD elongation, different pore structures (smaller PP, larger PE). Co-extrusion can be combined with lamination to create desired inventive stronger or unique multi-layer structures. And, minimum achievable thickness may be determined by the extrusion process. In some examples, the thinnest microlayers or nanolayers are formed by a co-extrusion die.

(3) Coating

The coating is not so limited, and may include any known coating for a battery separator, wherein an additive as described herein has been added to the coating. For example, the coating may be a ceramic coating comprising, consisting of, or consisting essentially of the additive, a coating comprising, consisting of, or consisting essentially of polycarbonate and the additive, or a coating comprising, consisting of, or consisting essentially of PVDF and the additive.

In one aspect, the coating layer may be an outermost coating layer of the separator, e.g., it may have no other different coating layers formed thereon, or the coating layer may have at least one other different coating layer formed thereon. For example, in some embodiments, a different polymeric coating layer may be coated over or on top of the coating layer formed on at least one surface of the porous substrate.

In some embodiments, the thickness of the coating layer is less than about 12 μm, sometimes less than 10 μm, sometimes less than 9 μm, sometimes less than 8 μm, sometimes less than 7 μm, and sometimes less than 5 μm. In at least certain selected embodiments, the coating layer is less than 4 µm, less than 2 µm, or less than 1 µm.

The coating method is not so limited, and the coating layer described herein may be coated onto a porous substrate by at least one of the following coating methods: extrusion coating, roll coating, gravure coating, printing, knife coating, air-knife coating, spray coating, dip coating, or curtain coating. The coating process may be conducted at room temperature or at elevated temperatures.

The coating layer may be any one of nonporous, nanoporous, microporous, mesoporous or macroporous. The coating layer may have a JIS Gurley of 700 or less, sometimes 600 or less, 500 or less, 400 or less, 300 or less, 200 or less, or 100 or less.

At least one of the optionally applied coating layers may comprise one or more additives as described herein. In some embodiments, all of the applied coating layers comprise one or more additives as described herein and in some embodiments some of the optionally applied coating layers comprise an additive as described herein. In embodiments where all or some of the coating layers comprise one or more additive as described herein, each coating layer may comprise the same or different additives or mixtures of additives.

(3) Additive

The additive is not so limited and may be any additive not inconsistent with the stated goals herein. In some embodiments, the additive is at least one selected from the group consisting of: a plasticizing agent, a shrinkage reducing agent, a surfactant, and a lubricating agent. In other embodiments, the additive is an electrolyte additive. One or more of the additives described herein may be added, and in some embodiments, a single additive serves many functions. For example, it could be a lubricating agent, a plasticizing agent, a shrinkage reducing agent, and a surfactant. In some embodiments, the additive could be a shrinkage reducing agent and an electrolyte additive.

The amount of additive is also not so limited, and may be from 500 to 50,000 ppm, from 500 to 25,000 ppm, from 500 to 15,000 ppm, from 500 to 10,000 ppm. In preferred embodiments, the additive is added in an amount from 1,000 to 10,000 ppm, from 1,000 to 9,000 ppm, from 1,000 to 8,000 ppm, from 1,000 to 7,000 ppm, from 1,000 to 6,000 ppm, from 1,000 to 5,000 ppm, from 1,000 ppm to 4,000 ppm, from 1,000 to 3,000 ppm, or from 1,000 to 2,000 ppm.

It is critical that additives do not adversely impact battery chemistry or performance. The effect of an additive may be determined by plotting capacity (mAh) vs. cycle index. The plot should not vary significantly when comparing a battery separator with the additive and a battery separator without the additive.

(4) Additives Selected from the Group of a Lubricating Agent, a Plasticizing Agent, a Shrinkage Reducing Agent, and/or a Surfactant The lubricating agent or lubricant described herein is not so limited. As understood by one of ordinary skill in the art, a lubricant is a compound that acts to reduce the frictional force between a variety of different surfaces, including the following: polymer:polymer; polymer:metal; polymer; organic material; and polymer:inorganic material. Specific examples of lubricating agents or lubricants as described herein are compounds comprising siloxy functional groups, including siloxanes and polysiloxanes, and fatty acid salts, including metal stearates.

Compounds comprising two or more, three or more, four or more, five or more, six or more, seven or more, eight or more, nine or more, or ten or more siloxy groups may be used as the lubricant described herein. Siloxanes, as understood by those in the art, are a class of molecules with a backbone of alternating silicon atom (Si) and oxygen (O) atoms, each silicon atom can have a connecting hydrogen (H) or a saturated or unsaturated organic group, e.g., —CH3 or C2H5. Polysiloxanes are a polymerized siloxanes, usually having a higher molecular weight. In some preferred embodiments described herein, the polysiloxanes may be high molecular weight, or even more preferred in some cases, ultra-high molecular weight polysiloxanes. In some embodiments, high and ultra-high molecular weight polysiloxanes may have weight average molecular weights ranging from 500,000 to 1,000,000.

The fatty acid salts described herein are also not so limited and may be any fatty acid salt that acts as a lubricant. The fatty acid of the fatty acid salt may be a fatty acid having between 12 to 22 carbon atoms. For example, the metal fatty acid may be selected from the group consisting of: Lauric acid, myristic acid, palmitic acid, stearic acid, oleic acid, linoleic acid, linolenic acid, palmitoleic acid, behenic acid, erucic acid, and arachidic acid. The metal is not so limited, but in preferred embodiments is an alkaline or alkaline earth metal, such as Li, Be, Na, Mg, K, Ca, Rb, Sr, Cs, Ba, Fr, and Ra. In some preferred embodiments, the metal is Li, Be, Na, Mg, K, or Ca.

In some preferred embodiments, the fatty acid salt is lithium stearate, sodium stearate, lithium oleate, sodium oleate, sodium palmitate, lithium palmitate, potassium stearate, or potassium oleate.

In some preferred embodiments described herein, the lubricant, including the fatty acid salts described herein, has a melting point of 200° C. or above, 210° C. or above, 220° C. or above, 230° C. or above, or 240° C. or above. A fatty acid salt such as lithium stearate (melting point of 220° C.) or sodium stearate (melting point 245 to 255° C.) or potassium stearate (melting point 240° C.) has such a melting point. A fatty acid salt such as calcium stearate (melting point 155° C.) does not. The inventors of this application have found that calcium stearate is less ideal, from a processing standpoint, than other fatty acid metal salts, e.g., metal stearates, having higher melting points. Particularly, it has been found that calcium stearate could not be added in amounts above 800 ppm without what has been termed a "snowing effect" where wax separates and gets everywhere during a hot extrusion process. Without wishing to be bound by any particular theory, using a fatty acid metal salt with a melting point above the hot extrusion temperatures is believed to solve this "snowing" problem. Fatty acid salts having higher melting points than calcium stearate, particularly those with melting points above 200° C., may be incorporated in amounts above 1% or 1,000 ppm, without "snowing." Amounts of 1% or above have been found to be important for achieving desired properties such as improved wettability and pin removal improvement, particularly for thinner separator. Amounts from 1,000 to 10,000 ppm, from 1,000 to 9,000 ppm, from 1,000 to 8,000 ppm, from 1,000 to 7,000 ppm, from 1,000 to 6,000 ppm, from 1,000 to 5,000 ppm, from 1,000 ppm to 4,000 ppm, from 1,000 to 3,000 ppm, or from 1,000 to 2,000 ppm are particularly preferable for this purpose in some embodiments.

In some other preferred embodiments, the fatty acid salts may have a solubility equal to or greater than that of lithium stearate in water, i.e., the metal fatty acid has the same solubility or is more soluble than lithium stearate in water. This may make the additive easier to incorporate into a coating slurry, including a ceramic coating slurry.

The plasticizing agent or plasticizer described herein is also not so limited. As understood by one of ordinary skill in the art, a plasticizer is a compound that may be added to polymers to make them easier to process and/or manipulate. Plasticizers, for example, reduce interactions between segments of polymer chains, decrease $T_g$, melt viscosity, and/or decrease elastic modulus. Plasticizers are selected, in some embodiments, to be nonvolatile materials and have good compatibility with the desired polymer or polymers that it is processed with. In some preferred embodiments herein, the plasticizer is lithium stearate.

The nucleating agent or nucleator described herein is not so limited and may be any nucleator or nucleating agent not inconsistent with the stated goals herein. A nucleating agent or nucleator, as understood by those skilled in the art, is an inorganic material added to polymers to increase the crystallinity and shorten the cycle times. They speed up the transition from melted to solid material. Changing the crystallinity of the polymer changes other properties of the polymer. For example, nucleators may increase the porosity of the microporous polymeric film containing them, which is accompanied by a decrease in the Gurley of the film. In some preferred embodiments herein, the nucleating agent is lithium stearate.

The shrinkage reducing agent described herein is not so limited and may be any shrinkage reducing agent not inconsistent with the stated goals herein. A shrinkage reducing agent is a compound that when added to the microporous polymeric film described herein reduces shrinkage of the film in any direction, particularly the machine direction (MD) and/or transverse direction (TD), which is perpendicular to the MD direction. In some preferred embodiments herein, the shrinkage reducing agent is lithium stearate.

The surfactant or surface-active agent described herein is not so limited and may be any surfactant not inconsistent with the stated goals herein. Surfactants or surface active agents, as understood by skilled artisans, are organic or inorganic compounds soluble in water and/or organic solvents. The surfactant molecules are amphiphilic, meaning that they contain hydrophilic or water-loving groups ("head" parts) and hydrophobic or water repelling groups ("tail" parts). This amphiphilic nature allows surfactants to interact with both polar (like water) and non-polar molecules (like oils). Surfactants include, for example, synthetic, anionic, amphoteric, zwitteronic, cationic and nonionic surfactants. In some preferred embodiments herein the surfactant is at least one of the fatty acid salts described herein, including lithium stearate.

In some embodiments, the additive is a compound that is each of a surfactant, a shrinkage reducing agent, a nucleator, a plasticizer, and a lubricant. One example of such an additive is lithium stearate, (5) Electrolyte Additives Electrolyte additives as described herein are not so limited as long as the electrolyte, is consistent with the stated goals herein. The electrolyte additive may be any additive typically added by battery makers, particularly lithium battery makers to improve battery performance. Electrolyte additives must also be capable of being combined, e.g., miscible, with the polymers used for the polymeric microporous film or compatible with the coating slurry. Miscibility of the additives may also be assisted or improved by coating or partially coating the additives. For example, exemplary electrolyte additives are disclosed in *A Review of Electrolyte Additives for Lithium-Ion Batteries*, J. of Power Sources, vol. 162, issue 2, 2006 pp. 1379-1394, which is incorporated by reference herein in its entirety. In some preferred embodiments, the electrolyte additive, is at least one selected from the group consisting of a SEI improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, and a viscosity improver. In some embodiments the additive may have more than one property, e.g., it may be a wetting agent and a viscosity improver.

Exemplary SEI improving agents include VEC (vinyl ethylene carbonate), VC (vinylene carbonate), FEC (fluoroethylene carbonate), LiBOB (Lithium bis(oxalato) borate). Exemplary cathode protection agents include N,N'-dicyclohexylcarbodiimide, N,N-diethylamino trimethylsilane, LiBOB. Exemplary flame-retardant additives include TTFP (tris(2,2,2-trifluoroethyl) phosphate), fluorinated propylene carbonates, MFE (methyl nonafluorobuyl ether). Exemplary $LiPF_6$ salt stabilizers include LiF, TTFP (tris(2, 2,2-trifluoroethyl) phosphite), 1-methyl-2-pyrrolidinone, fluorinated carbamate, hexamethyl-phosphoramide. Exemplary overcharge protectors include xylene, cyclohexylbenzene, biphenyl, 2,2-diphenylpropane, phenyl-tert-butyl carbonate. Exemplary Li deposition improvers include $AlI_3$, $SnI_2$, cetyltrimethylammonium chlorides, perfluoropolyethers, tetraalkylammonium chlorides with a long alkyl chain. Exemplary ionic salvation enhancer include 12-crown-4, TPFPB (tris(pentafluorophenyl)). Exemplary Al corrosion inhibitors include LiBOB, LiODFB, e.g., borate salts. Exemplary wetting agents and viscosity diluters include cyclohexane and $P_2O_5$.

In some preferred embodiments, the electrolyte additive is air stable or resistant to oxidation. A battery separator comprising the electrolyte additive disclosed herein may have a shelf life of weeks to months, e.g. one week to 11 months. This means, for example, that in one week, two weeks, three weeks, four weeks, 2 months, 3 months, 4 months, 5 months, 6 months, 7 months, 8 months, 9 months, 10 months, or 11 months, the separator will retain its ability to release the electrolyte additive into the electrolyte of a lithium ion battery when the battery separator is used in a lithium ion battery. For example, it will retain 70%, 80%, 90%, 95, or 100% of its original ability to release electrolyte into the electrolyte of a lithium ion battery. Once the battery separator is incorporated into the battery, it is no longer exposed to air, and therefore, will no longer be affected to any significant degree by oxidation. This shelf life is measured without the addition of a coating that will prevent or slow oxidation although a coating may be added to the separator to prevent oxidation and extend the shelf life of the battery separator.

(6) Composite, Vehicle, or Device

A composite comprising any separator as described hereinabove and one or more electrodes, e.g., an anode, a cathode, or an anode and a cathode, provided in direct contact therewith. The type of electrodes are not so limited. For example the electrodes can be those suitable for use in a lithium ion secondary battery.

A suitable anode can have a specific capacity greater than or equal to 372 mAh/g, preferably ≥700 mAh/g, and most preferably ≥1000 mAh/g. The anode be constructed from a lithium metal foil or a lithium alloy foil (e.g. lithium aluminum alloys), or a mixture of a lithium metal and/or lithium ahoy and materials such as carbon (e.g. coke, graphite), nickel, copper. The anode is not made solely from intercalation compounds containing lithium or insertion compounds containing lithium.

A suitable cathode may be any cathode compatible with the anode and may include an intercalation compound, an insertion compound, or an electrochemically active polymer.

Suitable intercalation materials include, for example, $MoS_2$, $FeS_2$, $MnO_2$, $TiS_2$, $NbSe_3$, $LiCoO_2$, $LiNiO_2$, $LiMn_2O_4$, $V_6O_{13}$, $V_2O_5$, and $CuCl_2$. Suitable polymers include, for example, polyacetylene, polypyrrole, polyaniline, and polythiopene.

A suitable electrolyte may be any electrolyte acceptable for use in a lithium ion battery. For example, in some embodiments, the electrolyte may be a Li salt in a liquid solvent such as $SO_2$ or $SOCl_2$, in some embodiments.

Any separator described hereinabove may be incorporated to any vehicle, e.g., an e-vehicle, or device, e.g., a cell phone or laptop, that completely or partially battery powered.

(7) Methods

The method for forming the battery separator described herein comprises, consists of, or consists essentially of at least one of the following steps (1) forming the microporous polymeric film from a polymeric mixture comprising a polymer and any of the additives or electrolyte additives disclosed herein; and (2) coating the microporous polymeric film with a coating mixture comprising any of the additives or electrolyte additives. In some embodiments, forming the microporous polymeric film comprises extruding the polymeric mixture or coextruding the polymer mixture, i.e., extruding the polymer mixture with one or more other polymer mixtures that contain or do not contain any of the additives or electrolyte additives disclosed herein. In some embodiments, forming the microporous film further comprises stretching the extruded polymer to form pores. In some embodiments the microporous film is a monolayer, bilayer, trilayer, or multilayer film. The monolayer may be formed by extrusion, the bilayer may be formed by coextrusion, the trilayer may be formed by coextrusion, or the multilayer may be formed by coextrusion. A bilayer film may be formed by extruding two monolayers and laminating them together. In some embodiments, a trilayer may be formed by extruding three monolayers and laminating them. A multilayer may be formed by extruding two or more monolayers and laminating them. A multilayer may be formed by coextruding three separate coextruded trilayers and laminating them. A multilayer may be formed by coextruding three separate bilayers and laminating them. A multilayer may be formed by coextruding three separate coextruded multilayers and laminating them. These are all only exemplary ways for forming the microporous film herein.

In some embodiments the battery separators described herein may be formed by, at least, coating a microporous polymeric film with a coating mixture comprising any of the additives or electrolyte additives described herein. The coating mixture is not so limited, and might be a ceramic coating mixture. The coating mixture may be coated on one or more sides of the microporous film.

The coating method is not so limited, and the coating layer described herein may be coated onto a porous substrate by at least one of the following coating methods: extrusion coating, roll coating, gravure coating, printing, knife coating, air-knife coating, spray coating, dip coating, or curtain coating. The coating process may be conducted at room temperature or at elevated temperatures.

Various embodiments of the invention have been described in fulfillment of the various objects of the invention. It should be recognized that these embodiments are merely illustrative of the principles of the present invention. Numerous modifications and adaptations will be readily apparent to those skilled in the art without departing from the spirit and scope of this invention.

EXAMPLES

In accordance with at least selected embodiments, aspects, or objects, additives and the incorporation of additives into microporous membranes (films) or separator membranes for use in secondary batteries may be provided. In some embodiments, the membrane (film) may contain additives that improve performances in battery, for example, in lithium ion batteries. In other selected embodiments, the membrane may contain additives, such as polysiloxane or lithium stearate, that improve battery manufacturing related performance, such as the ease of pin removal.

Polysiloxane Examples

Figure 2:
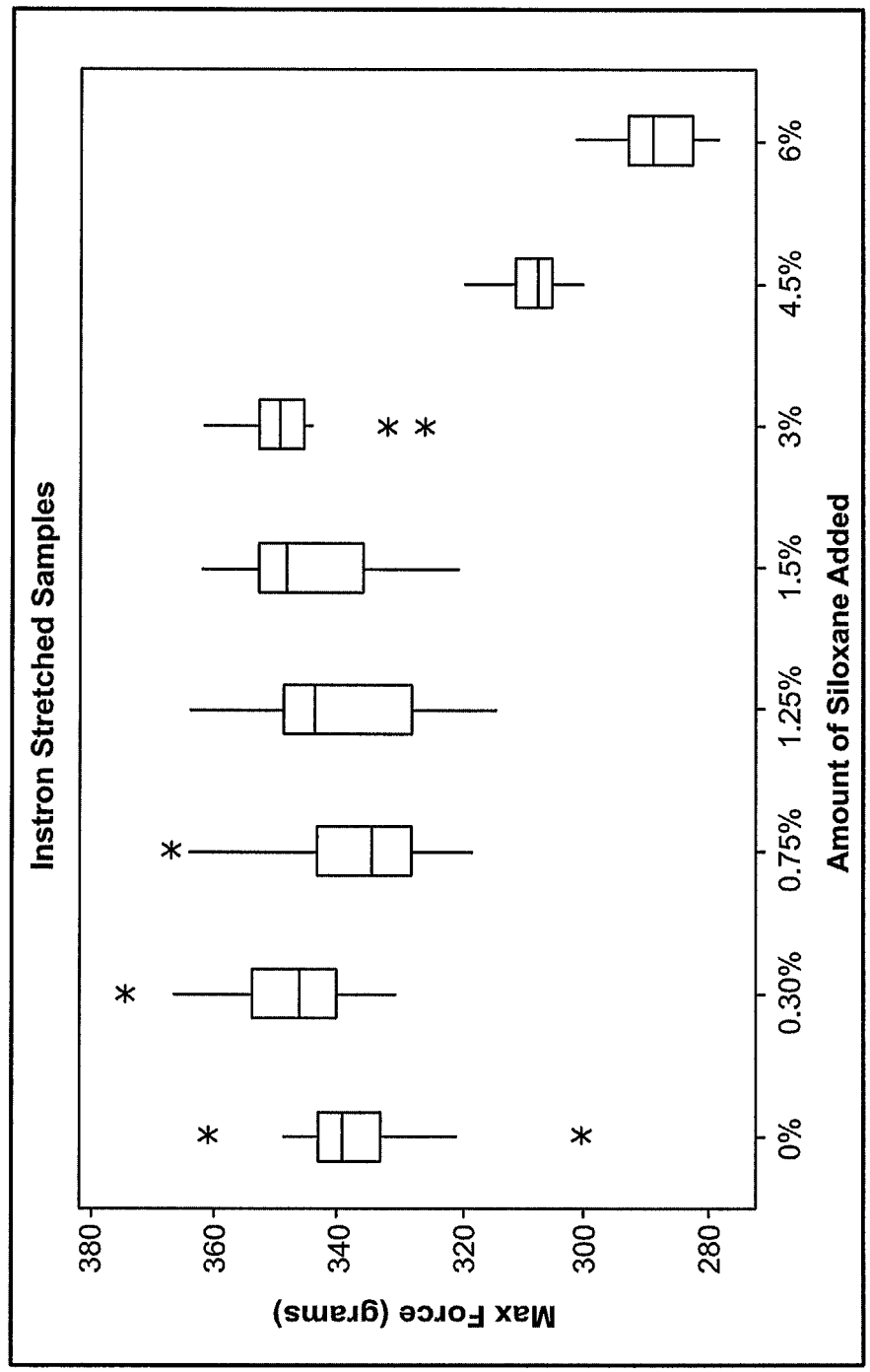
FIG. 2 is a box plot of puncture strength for battery separators according to some embodiments described herein.
Figure 3:
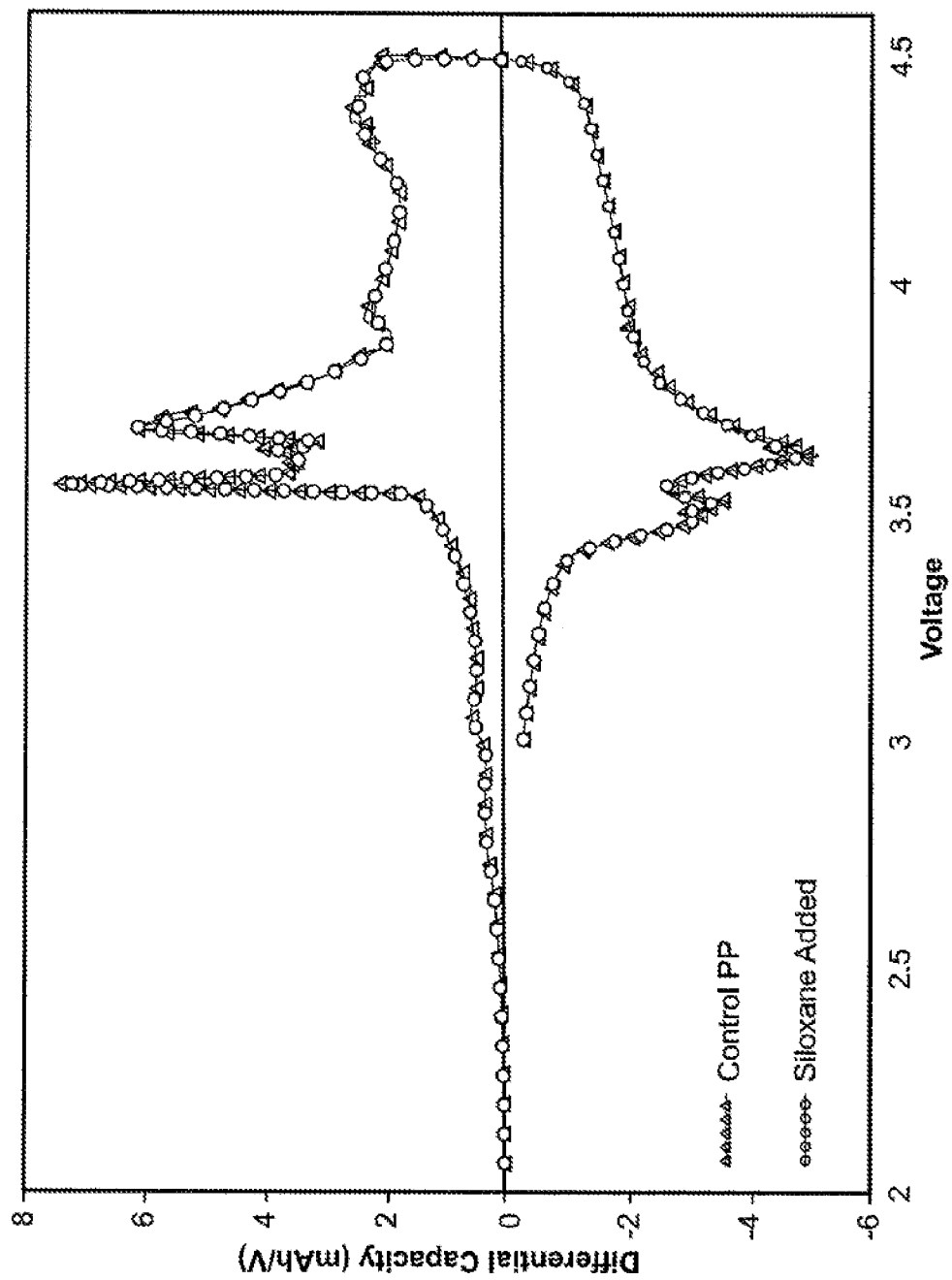
FIG. 3 is a differential capacity plot of a battery comprising a battery separator according to a control PP and an inventive siloxane containing embodiment described herein.
Figure 4:
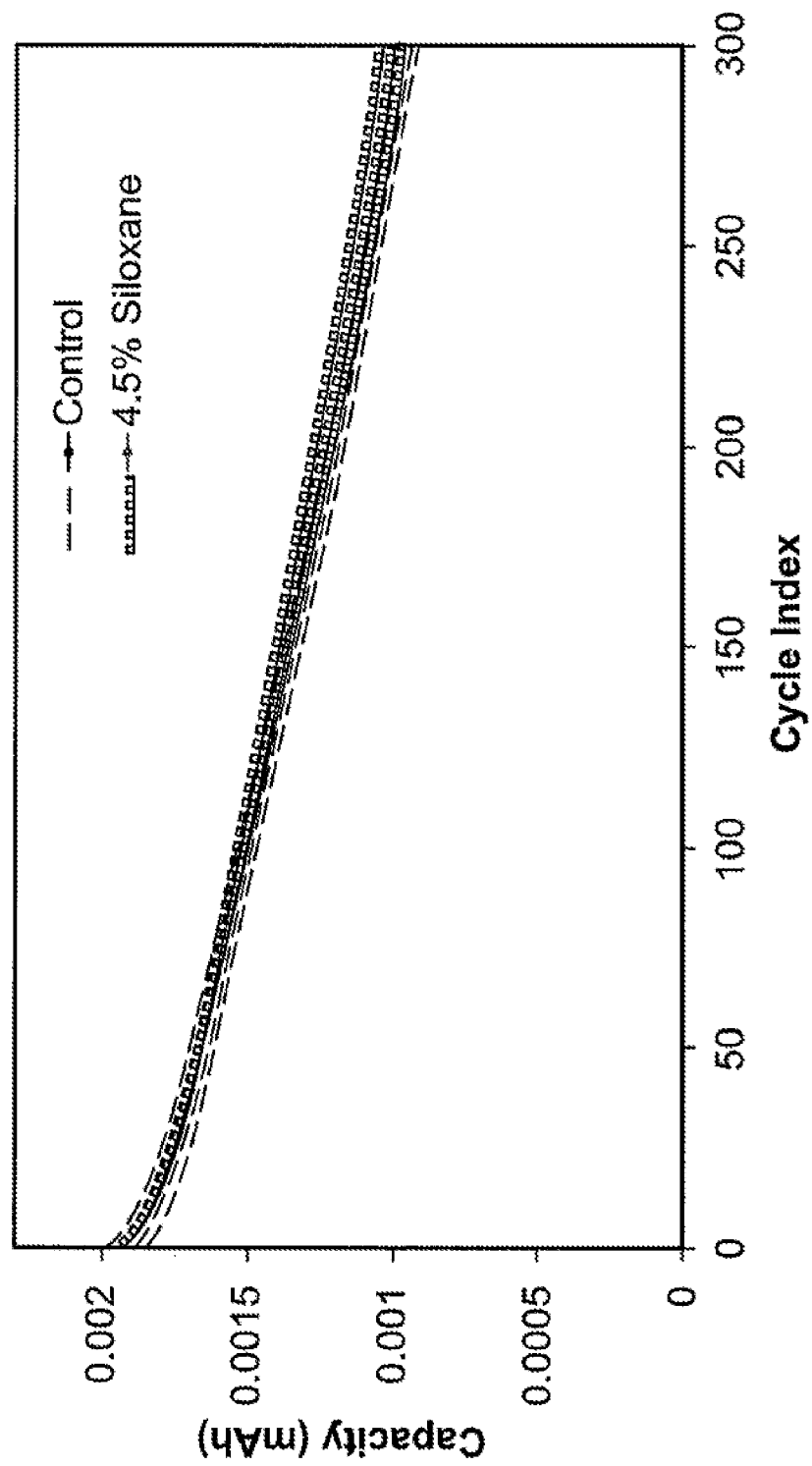
FIG. 4 is a graph showing cycle of battery separators according to a Control and some embodiments described herein.

TDX143 in FIG. 1 was prepared by forming two mono-extruded PP layers and one mono-extruded PE layer. The mono-extruded PP layers were formed by extruding a mixture comprising a polysiloxane. The three layers were laminated together to form a sandwich with the mono-extruded PE layer in the middle. Stretching is also done so that the resulting film is microporous. The amount of polysiloxane is 3,000 ppm or 3%. FIG. 1 shows that the pin removal force of TDX143 is reduced by the addition of polysiloxane. TDX144 in FIG. 1, which is also a trilayer PP-PE-PP film made in the same way as TDX143 except that a polysiloxane was not added, had higher pin removal force at winding tensions of 200 g and 350 g. Significant lubrication is achieved with polysiloxane. In addition, there is an improvement in puncture strength when up to 3% or 30,000 ppm polysiloxane is incorporated into the membrane illustrated in FIG. 2. As mentioned above, it is critical that additives do not adversely impact battery chemistry or performance. FIG. 3 illustrates that the incorporation of polysiloxane into a porous membrane separator does not impact battery system tested by cyclic voltammetry. Further battery cycling test, illustrated by FIG. 4, shows that capacity after 300 cycles are very similar for the cells contain 0% and 4.5% polysiloxane.

Figure 5:
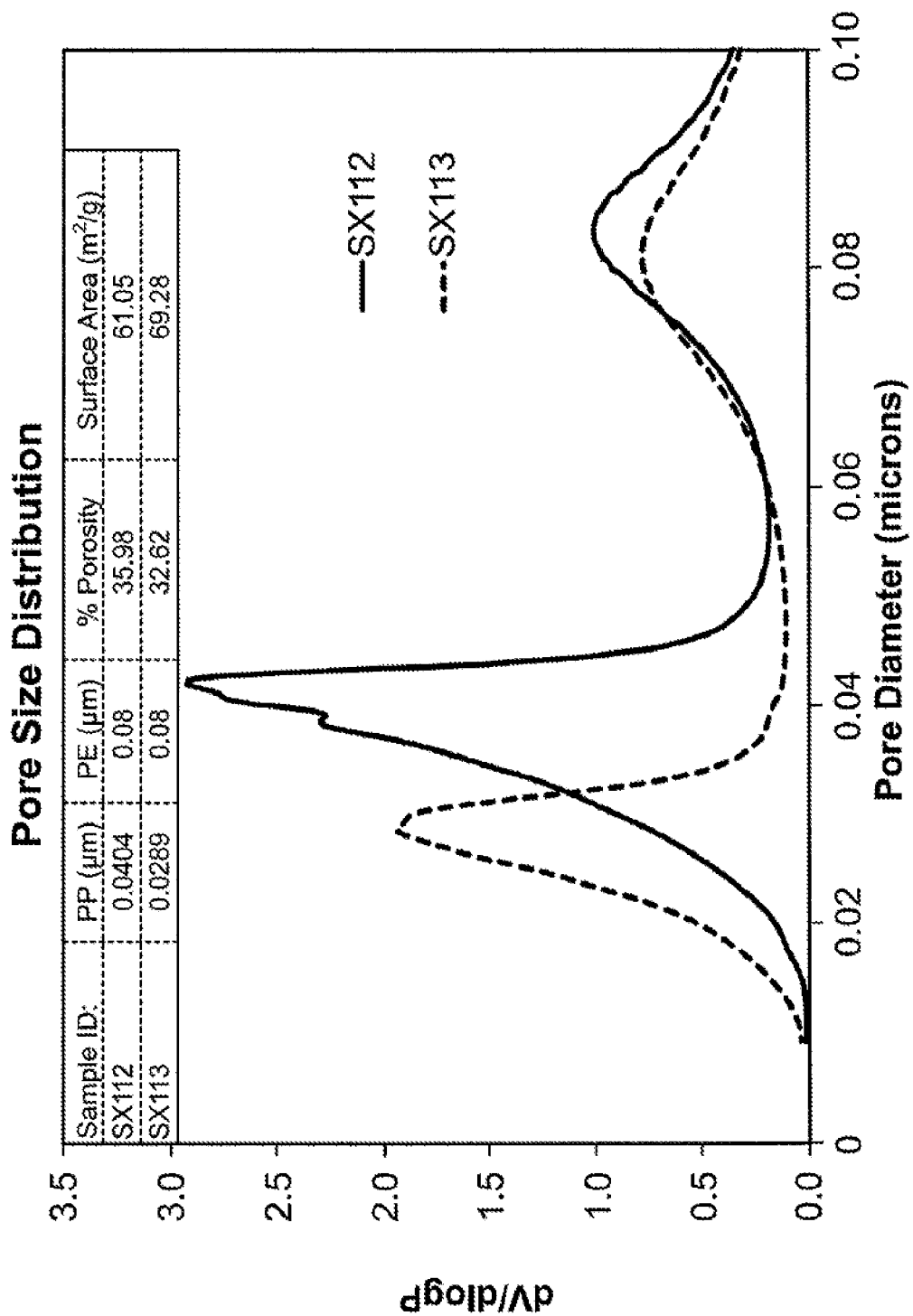
FIG. 5 is a pore-size distribution plot of battery separators according to some embodiments described herein.

SX112 in FIG. 5 was prepared by forming two mono-extruded PP layers and one mono-extruded PE layer. The mono-extruded PP layers were formed by extruding a mixture comprising a polysiloxane. The three layers were laminated together to form a sandwich with the mono-extruded PE layer in the middle. Stretching is also done so that the resulting film is microporous. The amount of polysiloxane is 3,000 ppm or 3%. SX113 in FIG. 5, which is also a trilayer PP-PE-PP film made in the same way as SX112 except that a polysiloxane was not added. FIG. 5 shows that the PP pore size of SX112 is larger than SX113 due to the addition of polysiloxane into the PP layers, while the PE pore size is the same for both films.

Test methods are described in the Test Methods section below.

Lithium Stearate Examples

Figure 6:
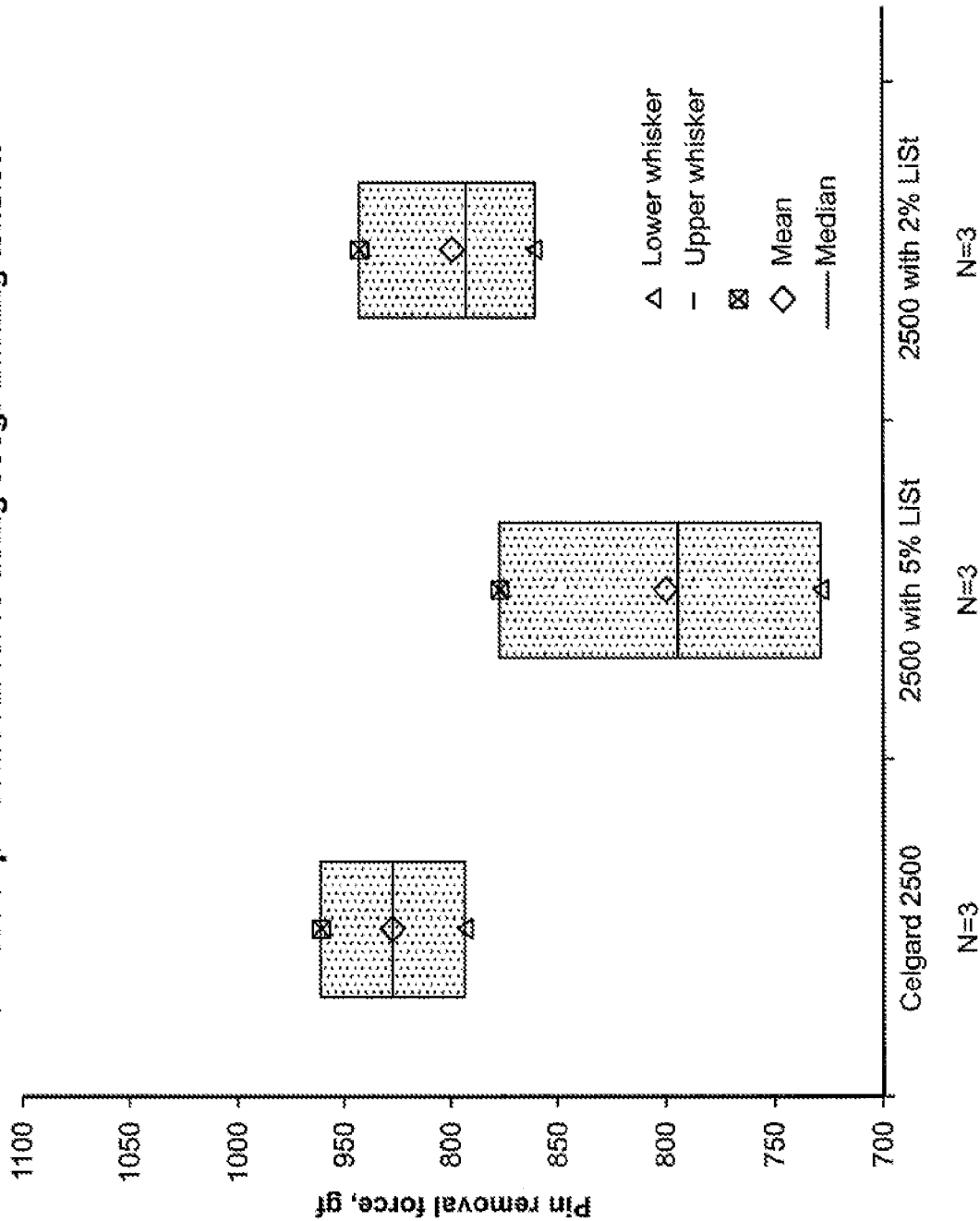
FIG. 6 is a box plot of pin removal force for battery separators according to a control (Celgard 2500) and some embodiments described herein.

In other embodiments, the additive may be a metallic stearate. For example lithium stearate. One function of lithium stearate is for pin removal force reduction. It is a better lubricant than, for example, calcium stearate due to its higher melting point and less "blooming" or "snowing" tendency in the extrusion process. As a result of its reduced tendency to "bloom" or "snow," much higher loading, e.g., as high as 5%, could be used. FIG. 6 shows the pin removal force of 24 μm thick mono-layer polypropylene separator is reduced after 2% (20,000 ppm) or 5%(50,000 ppm) LiSt is incorporated.

Lithium stearate acts as processing aid and plasticizer. It reduces polymer viscosity, therefore, much lower processing temperature is needed. Data in Table 1 demonstrates that after 5% (50,000 ppm) lithium stearate is incorporated, possibly between 10° C. to 30° C. less extruder and die temperature would be needed depending on the resin. In Table 1, Resin 1 and Resin 2 are polypropylene resins.

TABLE 1

|  | Resin 1 | | Resin 2 | |
| --- | --- | --- | --- | --- |
|  | Control | With 5% LiSt | Control | With 5% LiSt |
| Extruder temp, ° C. | 225 | 195 | 225 | 205 |
| Die temp, ° C. | 185 | 185 | 210 | 200 |

The use of lithium stearate additive in polypropylene can also improve membrane electrolyte wettability. Table 2 shows the average contact angle of the polypropylene membrane without additive and with 2% (20,000 ppm) and 5% (50,000 ppm) lithium stearate, using a propylene carbonate based electrolyte, which the most difficult electrolyte solvent for wetting. Reduction of contact angle from 91.5 to 81.4 degree is observed with 5% lithium stearate.

TABLE 2

| Data point | Contact angle of PP membrane, ° | Contact angle of PP membrane with 2% LiSt, ° | Contact angle of PP membrane with 5% LiSt, ° |
| --- | --- | --- | --- |
| 1 | 96.7 | 87.8 | 83.3 |
| 2 | 94.4 | 81.7 | 78.7 |
| 3 | 86.5 | 88.8 | 79.9 |
| 4 | 94.9 | 93 | 82.8 |
| 5 | 86.9 | 88.7 | 79.3 |
| 6 | 94.5 | 86.7 | 81.9 |
| 7 | 96.6 | 88.3 | 79.3 |
| 8 | 86.1 | 93.1 | 84.5 |
| 9 | 93.4 | 87.6 | 82.3 |
| 10 | 85 | 92.8 | 82 |
| AVG | 91.5 | 88.9 | 81.4 |

Figure 7:
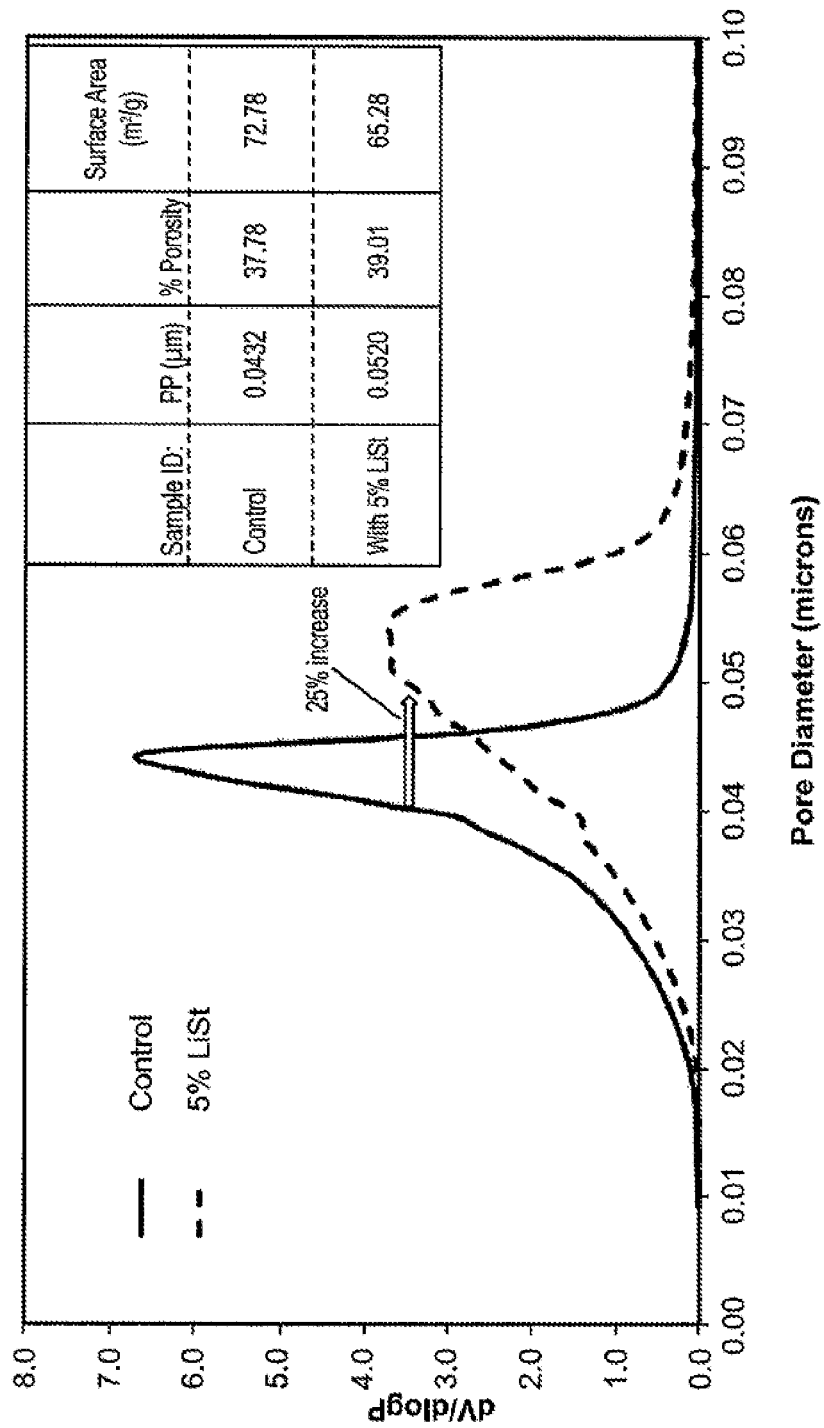
FIG. 7 is a pore-size distribution plot of battery separators according to a Control and an embodiment described herein.
Figure 8:
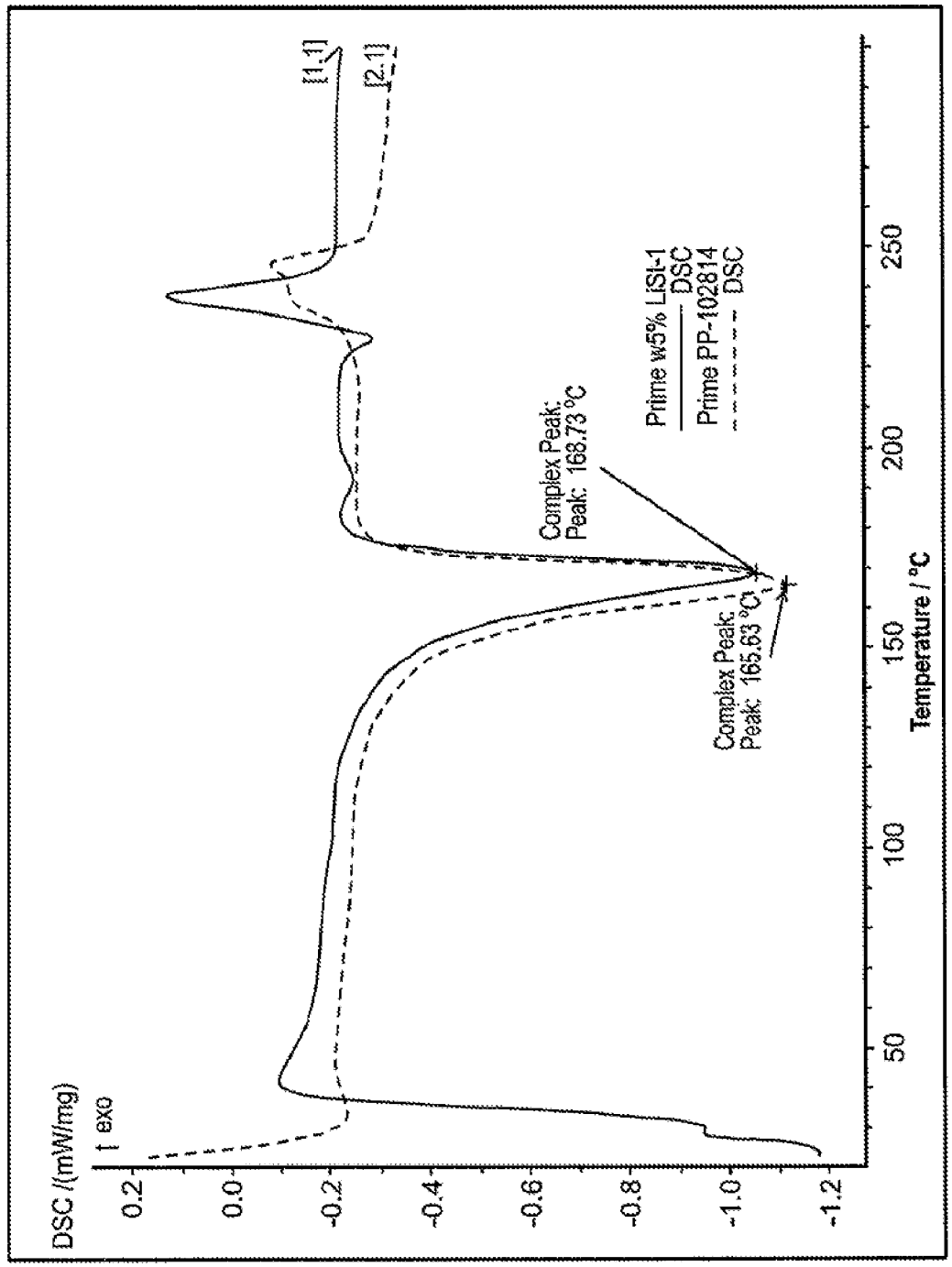
FIG. 8 is DSC overlays of a Prime Polymer polypropylene with and without 5% lithium stearate.

In other selected embodiments incorporating lithium stearate into porous membranes may be effective for increasing pore size and porosity. FIG. 7 is a pore distribution plot of PP membrane measured using Aquapore porosimeter by a water intrusion method. An increase of 25% in pore size is observed with 5% LiSt added. Without wishing to be bound by any particular theory, this phenomenon is believed to be due to the nucleating effect of lithium stearate, i.e., lithium stearate acting as a nucleating agent or nucleator. Lithium stearate's nucleating effect is also clearly illustrated by DSC overlays in FIG. 8 that with 5% lithium stearate added, a Prime Polymer polypropylene has peak crystallization temperature elevated from 165.63 to 168.73° C. Due to the higher peak crystallization temperature, the polymer can produce more crystalline precursor for making more pores of the porous membrane. Table 3 shows the overall comparison of 24 μm monolayer polypropylene membrane containing 0%, 2%, and 5% lithium stearate. Benefits include lower Gurley, and reduced shrinkage.

TABLE 3

|  |  |  | 2500 with LiSt | | 2500 Control |
| --- | --- | --- | --- | --- | --- |
| Property | | | 2% | 5% | 0% |
| Shrinkage | 105 C. 1 hr | % MD | 9.8 | 10.0 | 14.6 |
|  | 120 C. 1 hr | % MD | 20 | 19.8 | 24.9 |
| Thickness | Avg | μm | 23.9 | 23.8 | 22.6 |
| Gurley | Avg | s | 203 | 199 | 218 |
| Puncture Strength | Avg | gf | 230 | 200 | 225 |
| MD Tensile | Stress at break | Kgf/cm2 | 926 | 905 | 978 |
|  | Strain at break | % | 95 | 117 | 104 |
|  | Young's Modulus | kgf/cm2 | 6819 | 6811 | 6829 |
| TD Tensile | Stress at break | Kgf/cm2 | 121 | 118 | 119 |
|  | Strain at break | % | 353 | 55 | 78 |
|  | Young's Modulus | kgf/cm2 | 4305 | 3681 | 4020 |
| ER |  | ohm-cm2 | 1.04 | .96 | 1.01 |
| McMullin # |  |  | 3.8 | 3.5 | 3.9 |

Figure 9:
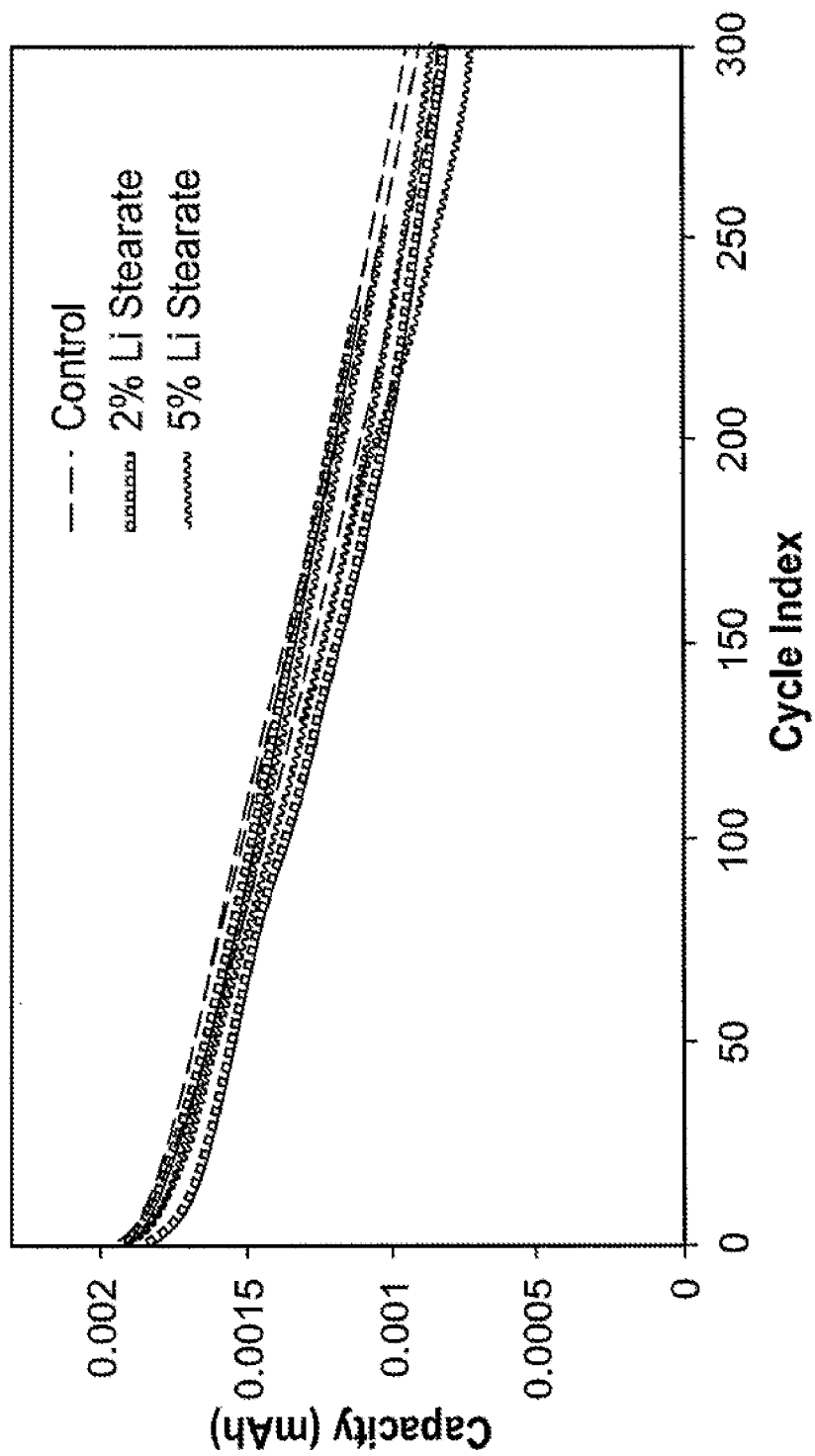
FIG. 9 is a graph showing cycle of battery separators according to a Control and some embodiments described herein.
Figures 15, 16:
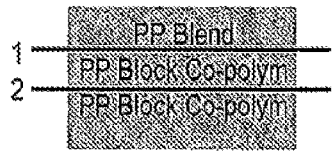
Figure 17:
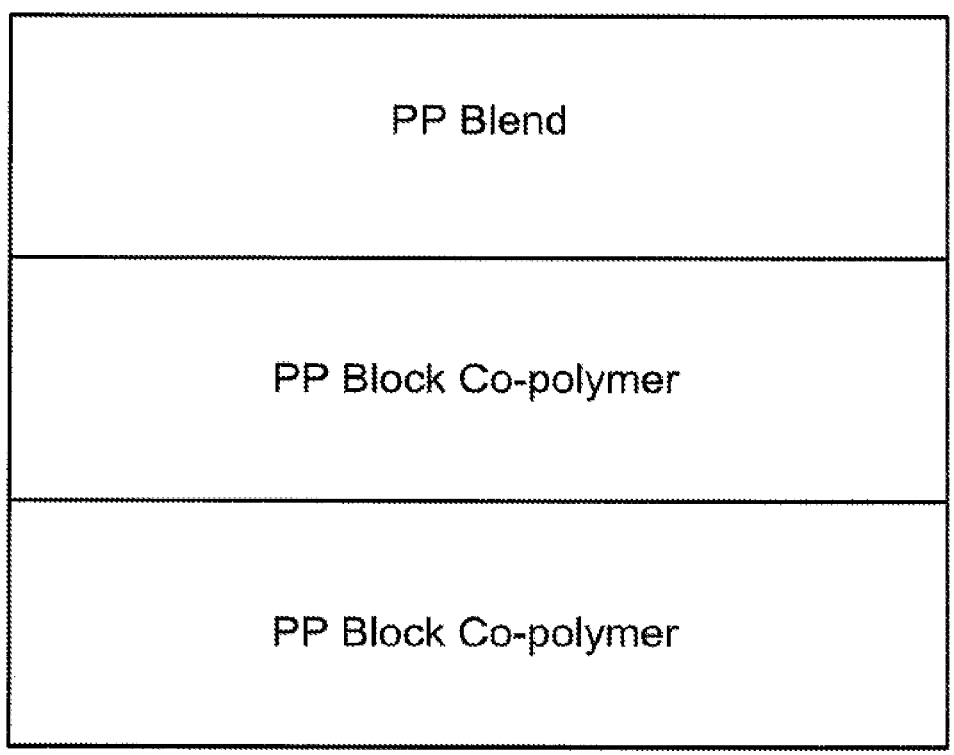

FIG. 9 shows that the cycle of life of membranes with 2 or 5% lithium stearate against control. Plots indicate that loading less than 5% is most preferred to avoid potential capacity decay.

Mainly with reference to FIGS. 11 to 17 and additional multilayer embodiments, here are additional Examples 10 to 23:

Example 10—Each PP and PE layer of the trilayer structure is itself made up of multiple layers, preferably co-extruded and then laminated—(PP/PP/PP)(PE/PE/PE)(PP/PP/PP)—all PP layers are made of a homopolymer PP, density=0.90 g/cm³, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm³ and 5% mLLDPE.

Example 11—(PP1/PP2/PP3)—PP1 is a Polypropylene blend, PP2 is a PP block co-polymer, and PP3 is the same as PP1, PP2, or a different blend or block co-polymer.

Example 12—(PP1/PP1) or (PP2/PP2) or (PP1/PP2)—PP1 is a Polypropylene blend, PP2 is a PP block co-polymer.

Example 13—(PP1/PP1/PP1) or (PP2/PP2/PP2)—PP1 is a Polypropylene blend, PP2 is a PP block co-polymer.

Example 14—(PP1/PP2/PP3)—PP1 is a Polypropylene blend, PP2 is a PP block co-polymer, and PP3 is the same or a different PP block copolymer.

Examples 15—(PP3/PP2/PP1)/(PP3/PP2/PP1)—PP1 is a Polypropylene blend, PP2 is a PP block co-polymer, and PP3 is the same or a different PP block copolymer.

Example 16—(PP1/PP2/PP3)/(PP3/PP2/PP1)—PP1 is a Polypropylene blend, PP2 is a PP block co-polymer, and PP3 is the same or a different PP block copolymer.

Example 17—(PP1/PP2)/(PP3/PP1)—PP1 is a Polypropylene blend, PP2 is a PP block co-polymer, and PP3 is the same or a different PP block copolymer.

Example 18—(PP1/PP2/PP3/PP1)—PP1 is a Polypropylene blend, PP2 is a PP block co-polymer, and PP3 is the same or a different PP block copolymer.

Example 19—(PP1/PP2/PP3)—PP1 is a Polypropylene blend, PP2 is a PP block co-polymer, and PP3 includes an adhesion promoter.

Example 20—(PO3/PP2/PP1)—PP1 is a Polypropylene blend, PP2 is a PP block co-polymer, and PO3 is a Polyolefin blend (such as PP+PE).

Example 21—(PP1/PP2/PP3)—PP1 is a homopolymer PP+ additives to modify the coefficient of friction as described herein, which may include any slip or block additives such as siloxane. PP2 is a homopolymer PP that is the same or different from that used in PP1 and includes a copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction (COF) that is the same or different from that used in PP1.

Examples 22—(PP3/PP2/PP1)—PP1 is a homopolymer PP+additives to modify the coefficient of friction (COF) as described herein, which may include any slip or block additives such as siloxane. PP2 is a homopolymer PP that is the same or different from that used in PP1 and PP3+copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction that is the same or different from that used in PP1.

Example 23—(PP3/PP2/PP1) or (PP1/PP2/PP3)—PP1 is a homopolymer PP+additives to modify the coefficient of friction (COF) as described herein, which may include any slip or block additives such as siloxane. PP2 is a homopolymer PP that is the same or different from that used in PP1 and PP3+copolymer PP, which may be any propylene ethylene or ethylene-propylene random copolymer, block co-polymer or elastomers. PP3 is a homopolymer PP that is the same or different from that in PP1 and PP2+copolymer PP, which may be any propylene ethylene or ethylene-propylene random copolymer, block co-polymer or elastomers.

The composition of the layers of the comparative products may be as follows:

Comparative Example 1—Typical monolayer PP (for example Celgard 2500)

Comparative Example 2—Typical laminated trilayer (PP/PE/PP)

Comparative Example 3—Typical ceramic coated versions of Typical monolayer PP or of Typical trilayer (PP/PE/PP)

TEST METHODS

Gurley

Gurley is defined herein as the Japanese Industrial Standard (JIS Gurley) and is measured herein using the OHKEN permeability tester. JIS Gurley is defined as the time in seconds required for 100 cc of air to pass through one square inch of film at a constant pressure of 4.9 inches of water.

Thickness

Thickness is measured in micrometers, µm, using the Emveco Microgage 210-A micrometer thickness tester and test procedure ASTM D374.

Tensile Strength

Machine Direction (MD) and Transverse Direction (TD) tensile strength are measured using Instron Model 4201 according to ASTM-882 procedure.

% MD elongation at break is the percentage of extension of a test sample along the machine direction of the test sample measured at the maximum tensile strength needed to break a sample.

% TD elongation at break is the percentage of extension of a test sample along the transverse direction of the test sample measured at the maximum tensile strength needed to break a sample.

Puncture Strength

Puncture Strength is measured using Instron Model 4442 based on ASTM D3763. The measurements are made across the width of the microporous membrane and the puncture strength defined as the force required to puncture the test sample.

Thermal Shrinkage

Shrinkage is measured by placing a test sample between two sheets of paper which is then clipped together to hold the sample between the papers and suspended in an oven. For the '105° C. for 1 hour' testing, a sample is placed in an oven at 105° C. for 1 hour. After the designated heating time in the oven, each sample was removed and taped to a flat counter surface using double side sticky tape to flatten and smooth out the sample for accurate length and width measurement. Shrinkage is measured in the both the Machine direction (MD) and Transverse direction (TD) direction and is expressed as a % MD shrinkage and % TD shrinkage.

Pore Size

Pore size is measured using the Aquapore Instrument available through Porous Materials, Inc. (PMI). Pore size is expressed in µm.

Porosity

The porosity of a microporous film sample is measured using ASTM method D-2873 and is defined as the percentage void spaces in a microporous membrane measured in both Machine Direction (MD) and Transverse Direction (TD).

Dielectric Breakdown (DB)

Voltage is applied to a separator membrane until the dielectric breakdown of the sample is observed. Strong separators show high DB. Non-uniformity in the separator membrane may lead to lower DB values.

Differential Capacity Analysis

Differential Capacity Analysis is performed in order to study the electrochemical stability of additive materials in a typical Lithium-ion battery electrolyte, 1 M $LiPF_6$ in 3:7 EC:EMC. Differential Capacity Analysis is generally used to study the electrochemical properties of an analyte in solution. Scan rate 15 mA/g.

Contact Angle

Contact angle to propylene carbonate is measured using KRUSS DSA100 contact angle analyzer. Measurement is taken within 3 seconds of dispensing of the droplet. The average contact angles of ten droplets is reported as the contact angle of the membrane.

Pin Removal Force

Separator strips of 6 inches in length and 45 mm in width are wound into jelly rolls with tensions of 50 g, 200 g and 350 g. The pin is 4 mm in diameter and 61 mm in length. After winding, the maximum force required to pull one or both pins out of the jelly is measured and reported as pin removal force.

Shear Viscosity

Viscosity is measured using TA HR-2 Discovery Hybrid Rheometer using parallel plate and 1 mm gap.

Electrostatic Charge

All measurements are collected inside dry lab after separator being dried for at least 24 hrs. SIMCO Ion Electrostatic field meter is used. Measuring distance is 25 mm from the surface of the separator.

Electrical Resistance

Electrical resistance can be measured in a non-battery electrolyte (e.g., a solution of KCl and deionized water) using an Agilent LCR meter or Instek LCR meter. Separator samples are prepared by cutting four identical samples of each different separator. Resistance measurements are taken for 1 layer, 2 layers, 3 layers, and 4 layers of separator.

DSC

The DSC analysis may be conducted to determine the melting temperature ($T_m$) and the onset of crystallinity. A Netzsch DSC device is used with a sealed aluminum sample holder with perforated lid. Nitrogen is used as the carrier gas at 40 ml/min to prevent sample oxidation. The mass of the analyzed samples varies from 5 to 6 mg. In order to determine $T_m$ and the onset of crystallinity the samples are initially subjected to thermal treatment to erase the thermal history. Next the instrument performs another heating and cooling cycle starting from 25° C. up to 300° C. at 10° C./min. Data acquisition and handling is made with *Proteus* Analysis software. The PE layers and PP layers can be evaluated separately.

MD Elongation (%)

% MD elongation at break is the percentage of extension of a test sample along the machine direction of the test sample measured at the maximum tensile strength needed to break a sample.

TD Elongation (%)

% A TD elongation at break is the percentage of extension of a test sample along the transverse direction of the test sample measured at the maximum tensile strength needed to break a sample.

Shutdown Temp (° C.)

The onset temperature for shutdown is recorded at the resistance reading of 100 W×cm$^2$ and is reported in ° C.

Shutdown Speed (ohm-cm$^2$)

The Example film is sandwiched between two nickel disks and wetted with PC solvent. The wet separator stack is then subjected to a temperature ramp of 60° C./min. For the duration of the test, the resistance between the two nickel disks is monitored by a multimeter. The definition for shutdown for this test is that the resistance should increase by two orders of magnitude from 100 W×cm$^2$ to 10,000 W×cm$^2$, and it is normalized by the time required for that resistance rise. The result for shutdown speed is reported in units of W×cm$^2$/sec.

MacMullin Number

The Electrical Resistance (ER) measurement is used to calculate the MacMullin number. The calculation is as follows: McMullin Number=(Electrical Resistance, Ω-cm$^2$/Separator thickness, cm)/Electrolyte Resistivity (ohm-cm).

Cycle Life

All cycling may be done in constant current (CC) mode.

Calculated Tortuosity.

Tortuosity was calculated by the following Formula (1):

$$N_m = T^2/P \qquad (1),$$

where $N_m$ is the MacMullin Number, T is the tortuosity, and P is the porosity. Without wishing to be bound by any particular theory, it is believed that a battery separator with higher tortuosity will be safer. The reason for this is believed to be that, due to the more tortuous path a growing dendrite will have to follow to go from the anode to the cathode, it will be more difficult for a dendrite to grow between the electrodes.

In accordance with at least selected embodiments, aspects or objects, this application or invention is directed to additives for improved battery performance, improved additive containing membranes, improved battery separators, and/or improved batteries, and/or improved or related methods of manufacture and/or use thereof. In accordance with at least certain embodiments, this application or invention is directed to additive-containing membranes, separator membranes, and/or battery separators, and/or methods for making and/or for using such membranes, separator membranes, and/or battery separators. In accordance with at least particular embodiments, this application or invention is directed to the incorporation of additives into microporous membranes or separator membranes for use in secondary lithium batteries, such as secondary lithium ion batteries, improved battery separators, and/or related methods. In some embodiments, the membrane may contain additives that improve performance in battery chemistries, for example, in lithium ion batteries. In other selected embodiments, the membrane may contain additives that improve pin removal performance such as siloxane or lithium stearate. In other certain embodiments, the invention may also relate to methods for making such a membrane or separator membrane and methods for using such a membrane or separator membrane, for example, as a lithium battery separator. In accordance with at least selected embodiments, the present application or invention is directed to novel or improved porous membranes, separator membranes, separators, dry process separators, composites, electrochemical devices, batteries, methods of making such membranes, separators, composites, devices and/or batteries. In accordance with at least certain selected embodiments, the present invention is directed to a novel or improved separator membrane that contains additives or elastomers. The improved membrane may preferably demonstrate improved shutdown, improved strength, improved dielectric breakdown strength, and/or reduced tendency to split. In accordance with at least certain selected embodiments, this application or invention is directed to battery separators having a microporous polymeric film or membrane and an optional coating layer on at least one side of the microporous polymeric film, wherein at least one of the microporous polymeric film and the optional coating comprises an additive. The additive may be selected from the group of a lubricating agent, a plasticizing agent, a nucleating agent, a shrinkage reducing agent, a surfactant, an SEI improving agent, a cathode protection agent, a flame retardant additive, LiPF$_6$ salt stabilizer, an overcharge protector, an aluminum corrosion inhibitor, a lithium deposition agent or improver, or a solvation enhancer, an aluminum corrosion inhibitor, a wetting agent, a viscosity improver, a friction reducer, a COF reducer, a pin removal force reducer, a co-polymer, a block co-polymer, and/or combinations thereof. Also, described herein are batteries, including primary or secondary lithium ion batteries, comprising one or more of the described films, membranes, coatings, and/or separators. Methods for making the films, membranes, coatings, and/or battery separators are also described. In accordance with at least particular embodiments, this application or invention is directed to improved or novel battery separators having at least one of increased puncture strength, decreased pin removal force, improved electrolyte wettability, and increased pore size, microporous polymeric films with an optional coating layer on at least one side of the microporous polymeric film, battery separators having at least one of an optional coating and an microporous polymeric film including therein and/or thereon an additive selected from the group of a lubricating agent, a surfactant, a nucleating agent, a shrinkage reducing agent, and/or a plasticizing agent, microporous polymeric films having an additive present mainly in at least one surface region of the film or present throughout the film, present in a single surface region of the film, present in a first surface region of the film and in a second surface region of the film that is opposite to the first surface region, a coating applied to a surface of the microporous polymeric film, the coating may be applied to only one surface of the microporous polymeric film, to a first side of the microporous polymeric film and another coating may be applied to a second side of the microporous polymeric film that is opposite to the first side, and/or combinations thereof. In accordance with at least possibly preferred embodiments, the microporous polymeric film or membrane is a microporous polyolefin membrane such as a dry stretch process membrane such as a monolayer dry-process film, a bilayer dry-process film, or a multilayer dry-process film. Also, in accordance with at least possibly preferred embodiments, one, or two, or three, or four, or all five of the different types of additives may be added or a single additive that acts as one, or two, or three, or four, or all five of the different types of additives may be added to the film, coating or separator, for example, an additive that is both a lubricant and a surfactant may be added therein or thereon.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

The invention claimed is:
1. A battery separator, comprising:
a microporous polymeric film which comprises one or more layers; and
wherein at least one outer layer of the microporous polymeric film is an extruded layer formed by extruding a polyolefin with an additive comprising a polysiloxane, and at least 1% of a fatty acid salt having a melting point above 200° C., wherein the polysiloxane is an ultra-high molecular weight polysiloxane.

2. The battery separator of claim 1, wherein the microporous polymeric film comprises the additive, which is optionally mainly present in one or more surface regions of the microporous film.

3. The battery separator of claim 1, wherein the microporous polymeric film is a nonwoven, a dry-process monolayer film, a dry-process bi-layer film, a dry-process multilayer film, or a microporous polymeric film that comprises a polyolefin.

4. The battery separator of claim 1, wherein the additive further comprises a nucleating agent.

5. The battery separator of claim 1, wherein the additive further comprises a surfactant.

6. The battery separator of claim 1, wherein the additive further comprises a shrinkage reducing agent.

7. The battery separator of claim 1, wherein the additive further comprises one or more selected from the group consisting of borate salts and vinyl carbonates.

8. A lithium battery comprising the separator of claim 1.

9. A battery separator, comprising:
a microporous polymeric film which comprises one or more layers; and
wherein at least one outer layer of the microporous polymeric film is an extruded layer formed by extruding a polyolefin with an additive comprising a polysiloxane, and a fatty acid salt having a melting point above 200° C., wherein the polysiloxane is an ultrahigh molecular weight polysiloxane.

* * * * *